(12) United States Patent  
Prats et al.

(10) Patent No.: US 9,049,258 B2  
(45) Date of Patent: Jun. 2, 2015

(54) SYSTEMS AND METHODS FOR ANCHORING CONTENT OBJECTS TO STRUCTURED DOCUMENTS

(75) Inventors: Diego Prats, Burbank, CA (US); Eduardo Prats, Burbank, CA (US); Oscar Guido, Los Angeles, CA (US); Nicolas LaCasse, Los Angeles, CA (US); Daniel Yoder, Santa Monica, CA (US)

(73) Assignee: BORDER STYLO, LLC, Hollywood, CA (US)

( * ) Notice: Subject to any disclaimer, the term of this patent is extended or adjusted under 35 U.S.C. 154(b) by 1057 days.

(21) Appl. No.: 12/756,874

(22) Filed: Apr. 8, 2010

(65) Prior Publication Data

US 2011/0066957 A1 Mar. 17, 2011

Related U.S. Application Data

(60) Provisional application No. 61/243,431, filed on Sep. 17, 2009.

(51) Int. Cl.
| | |
|---|---|
| G06F 17/20 | (2006.01) |
| H04L 29/06 | (2006.01) |
| G06F 17/24 | (2006.01) |
| G06F 17/30 | (2006.01) |
| G06F 17/22 | (2006.01) |

(52) U.S. Cl.  
CPC ............ *H04L 65/403* (2013.01); *G06F 17/241* (2013.01); *G06F 17/30896* (2013.01); *G06F 17/2247* (2013.01)

(58) Field of Classification Search  
None  
See application file for complete search history.

(56) References Cited

U.S. PATENT DOCUMENTS

| | | | |
|---|---|---|---|
| 5,724,595 A | 3/1998 | Gentner | |
| 5,870,552 A | 2/1999 | Dozier et al. | |
| 5,941,947 A | 8/1999 | Brown et al. | |
| 6,763,496 B1 * | 7/2004 | Hennings et al. | 715/205 |
| 7,562,302 B1 | 7/2009 | Barrus et al. | |
| 8,244,755 B2 | 8/2012 | Carraher et al. | |
| 8,533,238 B2 | 9/2013 | Yu et al. | |
| 2004/0139169 A1 * | 7/2004 | O'Brien et al. | 709/217 |

(Continued)

FOREIGN PATENT DOCUMENTS

| | | | |
|---|---|---|---|
| EP | 1610230 A2 * | 12/2005 | |
| EP | 2065809 A1 * | 6/2009 | |
| WO | 2000-07110 | 2/2000 | |

OTHER PUBLICATIONS

International Search Report for PCT/US2010/049321, Jun. 1, 2011.

*Primary Examiner* — Matt Kim  
*Assistant Examiner* — William Trapanese  
(74) *Attorney, Agent, or Firm* — Saul Ewing LLP

(57) ABSTRACT

In one embodiment, a method includes, in connection with a target structured document rendered by a first client application and in response to a user input directed to target content of the target structured document, accessing, by a second client application, a document object model (DOM) representation of the target structured document, determining a target DOM node associated with the target content, recursively scanning one or more properties of each of one or more DOM nodes logically arranged proximal to the target DOM node within the DOM hierarchical tree, generating a set of one or more anchor point definitions based on one or more selected properties of each of the target DOM node and one or more selected ones of the scanned DOM nodes, and storing the set of anchor point definitions in a data structure.

32 Claims, 11 Drawing Sheets

(56) References Cited

U.S. PATENT DOCUMENTS

| | | |
|---|---|---|
| 2004/0145593 A1 | 7/2004 | Berkner |
| 2004/0148173 A1* | 7/2004 | Wu .................... 704/270.1 |
| 2004/0177002 A1 | 9/2004 | Abelow |
| 2005/0055628 A1* | 3/2005 | Chen et al. .................... 715/512 |
| 2007/0011140 A1 | 1/2007 | King |
| 2007/0073934 A1 | 3/2007 | Rogers |
| 2007/0124507 A1* | 5/2007 | Gurram et al. .................... 710/1 |
| 2008/0005106 A1* | 1/2008 | Schumacher et al. ............. 707/6 |
| 2009/0199083 A1* | 8/2009 | Sar et al. ....................... 715/231 |
| 2009/0276455 A1 | 11/2009 | Yu et al. |
| 2010/0253764 A1 | 10/2010 | Sim et al. |
| 2010/0332515 A1 | 12/2010 | Carraher et al. |
| 2012/0047119 A1 | 2/2012 | Kandekar et al. |

* cited by examiner

SYSTEMS AND METHODS FOR ANCHORING CONTENT OBJECTS TO STRUCTURED DOCUMENTS

RELATED APPLICATION

This application claims the benefit, under 35 U.S.C. §119 (e), of U.S. Provisional Patent Application No. 61/243,431, entitled Systems and Methods for Sharing User Generated Slide Objects Over a Network, filed 17 Sep. 2009, and incorporated herein by reference.

TECHNICAL FIELD

The present disclosure relates generally to networking and, more particularly, to systems and methods for enabling users to share personalized content directed to selected structured documents, such as web pages from websites or web applications, with other network users.

BACKGROUND

Computer users are able to access and share vast amounts of information through various local and wide area computer networks including proprietary networks as well as public networks such as the Internet. Typically, a web browser installed on a user's computing device facilitates access to and interaction with information located at various network servers identified by, for example, associated uniform resource locators (URLs). Modern web browsers often feature intuitive graphical user interfaces (GUIs) that enable users to easily navigate from one website or webpage to another in pursuit of information the user desires.

While modern web browsing software has revolutionized the manner in which users approach information retrieval over a network, many limitations remain with conventional web browsing software. By way of example, among these limitations is the relative inability of a user to contribute and share meaningful personal or user-generated content to contacts and associates over a network without such functionality being built-in to a particular website or web application itself. Conventional approaches to enable sharing of user-generated content include various information sharing technologies or platforms such as web logging or blogging typically enabled in the form of blogging websites (e.g., www.blogger.com), wiki sites that allow user collaboration (e.g., Wikipedia™), and social networking websites (e.g., websites linked with applications enabling users to view "profiles" created or customized by other users utilizing standardized templates where visibility and interaction with such profiles by other users is governed by some characteristic set of "social rules"). These and other conventional platforms only allow or enable a user limited capability in sharing personalized user-generated content, such as his or her views, opinions, reactions, or feedback, with other users having access to the same network or websites. By way of example, access to a user's views or other personalized content is generally limited to authorized users of a particular website and further limited to the content of the particular website. Hence, a user's ideas or contributions are effectively walled off from content residing on other websites.

DESCRIPTION OF EXAMPLE EMBODIMENTS

Figure 1:
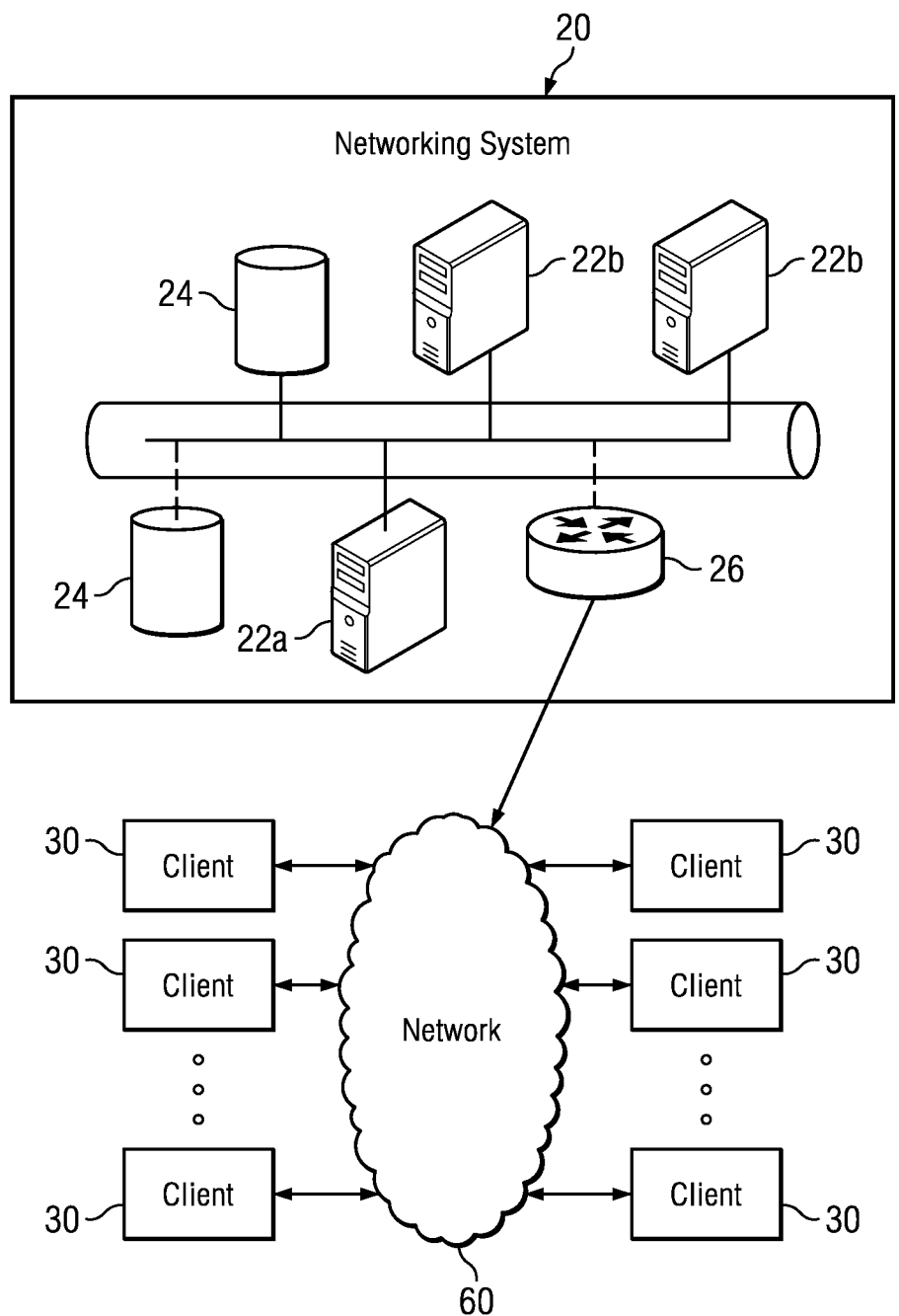
FIG. 1 illustrates an example network environment.

Particular embodiments relate to a plug-in software application (hereinafter referred to as "slide-generating application") that operates or executes in the context of a browser (e.g., a web browser) or other application client that consumes structured documents, such as HyperText Markup Language (HTML) or any other document format with structural semantics (e.g., Exenstible Markup Language (XML), Standard Generalized Markup Language (SGML), Portable Document Format (PDF), and the like). In alternate embodiments, the slide-generating application may operate independently of a user's standard web browser, and as such, may be a stand-alone client application that includes its own web browsing functionality. In accordance with particular embodiments, the slide-generating application may be utilized, in conjunction with a target structured document (e.g., a structured document rendered on a viewer's or user's computing device), to facilitate the generating, positioning, and subsequent rendering of additional content including comments, personalized content, or other content not native to the target structured document (hereinafter referred to in the context of a non-native content object or "slide object"). By way of example, the target structured document may be a webpage rendered in conjunction with a web browser and a corresponding website or web application of interest to a user of the slide-generating application. The slide-generating application may also be utilized to view slide objects authored or generated by other users. Furthermore, in some example embodiments, the slide-generating application may be utilized to track and generate valuable (and potentially anonymous), aggregate metrics associated with various users' slide object-creating histories, as well as other activities associated with usage of the system.

In accordance with particular described embodiments, systems and methods for allowing a user to attach and share personalized comments and/or media data content (e.g., including, but not limited to, textual, audio, graphical, and video content) as slide objects to various webpages or to specific target content within such webpages is provided. More specifically, in particular embodiments the slide-generating application provides a means for users to post and share personal or non-native content for rendering on a given webpage with other selected users having access to the same webpage at their respective computing devices. In various example embodiments, the slide-generating application may be utilized to generate and share slide objects associated with virtually any webpage of interest to the slide object creator or of interest to the selected recipients. By way of example, example webpages may be associated with news websites, wiki websites, social networking websites, among numerous others.

In particular embodiments, the slide-generating application renders, or causes to be rendered, a user interface (e.g., in addition to or as an added part of the interface generated by the user's web browser) that enables the user of the slide-generating application to generate slide objects and associate the slide objects with respective target content (the target content being rendered in conjunction with the rendering of a target structured document) for subsequent rendering and viewing by one or more other users automatically without any additional input from the other users when the other users view the same or similar viewing media (e.g., when they view the target structured webpage or other structured document that contains the particular target content that the slide object creator has associated with the slide object). Additionally, in particular embodiments, the user interface generated by the slide-generating application also enables the user to view content in slide objects generated or authored by both himself or herself as well as other users within the same or similar viewing media. In such manners, particular embodiments add another level of interactivity amongst users of network-based media including social networks and the World Wide Web, and thus may improve each user's own viewing experience.

As described above, the slide-generating application may be implemented in the form of a plug-in software component that works (e.g., executes or operates) in conjunction with a web browser operating on a user's computing device. Hence, particular embodiments of the slide-generating application work seamlessly and operate in tandem with existing software (e.g., a web browser) already residing on a user's computing device. In this manner, a user is not required to switch out of his or her browser program to utilize various aspects of particular embodiments.

Particular embodiments may operate in a wide area network environment, such as the Internet, including multiple network-addressable systems. FIG. 1 illustrates an example network environment, in which various example embodiments may operate. Network cloud 60 generally represents one or more interconnected networks, over which the systems and hosts described herein can communicate. Network cloud 60 may include packet-based wide area networks (such as the Internet), private networks, wireless networks, satellite networks, cellular networks, paging networks, and the like. As FIG. 1 illustrates, particular embodiments may operate in a network environment comprising networking system 20 and one or more client devices 30. Client devices 30 are operably connected to the network environment via a network service provider, a wireless carrier, or any other suitable means. In particular embodiments, each client device 30 hosts a slide-generating application and a web browser.

Networking system 20 comprises computing systems (e.g., servers) that work with slide-generating applications respectively residing at user's computing devices (e.g., client devices 30) and allow users to communicate or otherwise interact with each other and access content, such as user profiles and slide objects, as described herein. Networking system 20 is a network addressable system that, in various example embodiments, comprises one or more physical servers 22 and data store 24. The one or more physical servers 22 are operably connected to computer network 60 via, by way of example, a set of routers and/or networking switches 26. In an example embodiment, the functionality hosted by the one or more physical servers 22 may include web or HTTP servers, FTP servers, as well as, without limitation, webpage and applications implemented using Common Gateway Interface script (CGI), PHP Hyper-text Preprocessor (PHP), Active Server Pages (ASP), Hyper Text Markup Language (HTML), Extensible Markup Language (XML), Java, JavaScript, AJAX, Flash, Silverlight, and the like.

Physical servers 22 may host functionality directed to the operations of networking system 20. By way of example, networking system 20 may be configured to interact with slide-generating applications residing at respective client devices 30 as well as with websites or web applications hosting webpages or other structured documents accessible and renderable by client devices 30. In some embodiments, networking system 20 may itself host a website that allows users at client devices 30 hosting the slide-generating application to create slide objects, view slide objects (created by the user or other users), and select recipient users for selected slide objects. Hereinafter, servers 22 may be referred to as server 22, although server 22 may include numerous servers hosting, for example, networking system 20, as well as other content distribution servers, data stores, and databases.

Data store 24 may store content and data relating to slide objects as well as other data relating to, and enabling, operation of networking system 20, as digital data objects. A data object, in particular implementations, is an item of digital information typically stored or embodied in a data file, database or record (e.g., in a data structure). Digital data objects may include data of many forms, including: text or hypertext (e.g., ASCII, SGML, HTML), images (e.g., jpeg, tif and gif), graphics (vector-based or bitmap), audio, video (e.g., mpeg), or other multimedia, and combinations thereof. Digital data objects may also include executable code objects (e.g., games executable within a browser window or frame), podcasts, etc. Logically, data store 24 corresponds to one or more of a variety of separate and integrated databases, such as relational databases and object-oriented databases, that maintain information as an integrated collection of logically related records or files stored on one or more physical systems. Structurally, data store 24 may generally include one or more of a large class of data storage and management systems. In particular embodiments, data store 24 may be implemented by any suitable physical system(s) including components, such as one or more database servers, mass storage media, media library systems, storage area networks, data storage clouds, and the like. In one example embodiment, data store 24 includes one or more servers, databases (e.g., MySQL), and/or data warehouses (e.g., Hadoop/Hive). Data store 24 may also include or be implemented as a document-oriented database, distributed hash tables (DHTs), or key-value storage systems.

Data store 24 may include data associated with different users of networking system 20 and client devices 30. In particular embodiments, networking system 20 maintains a user profile for each user of networking system 20 that may or may not be accessible (e.g., via a webpage) to the user. User profiles may include data that describe the users of networking system 20, which may include, for example, proper names (first, middle and last of a person, a tradename and/or company name of a business entity, etc.) biographic, demographic, and other types of descriptive information, such as work experience, educational history, hobbies or preferences, geographic location, and additional descriptive data. The user profiles may also include a user's birthday, relationship status, city of residence, and the like. Networking system 20 may further store data describing one or more relationships between different users. In one example embodiment, a user, using the slide-generating application, may establish "friendships" or social relationships with other users of networking system 20 similar to a social networking website (hereinafter also referred to as contacts). This may facilitate the viewing, by the user, of slide objects generated by the user's "friends" or contacts, and the viewing, by the user's friends, of slide objects generated by the user. A user profile may also include privacy settings governing access to the user's personal information and slide objects generated or stored by the user.

Client device 30 is generally a computer or computing device including functionality for communicating (e.g., remotely) over a computer network. Client device 30 may be a desktop computer, laptop computer, television (TV), personal digital assistant (PDA), in- or out-of-car navigation system, smart phone or other cellular or mobile phone, or mobile gaming device, among other suitable computing devices. Client device 30 may execute one or more client applications, including the slide-generating application and a web browser (e.g., Microsoft Windows Internet Explorer, Mozilla Firefox, Apple Safari, Google Chrome, and Opera, etc.), to access and view content over a computer network. In particular implementations, various client applications allow a user of client device 30 to enter addresses (e.g., Uniform Resource Locators (URLs)) of specific network resources to be retrieved, such as resources hosted by networking system 20 and other websites or web applications. In addition, once a page or other resource has been retrieved, the client applications may provide access to other pages or records when the user "clicks" on hyperlinks to other resources. By way of example, such hyperlinks may be located within the web pages and provide an automated way for the user to enter the URL of another page and to retrieve that page. With other client application types, other identifiers and access retrieval methods can be used.

As described above, the slide-generating application enables a user to add personalized or non-native content in the form of slide objects to a webpage hosted by a website or associated with a web application. Generally, a web application is an application that may be accessed via a web browser or other client application over a network, or a computer software application that is coded in a web browser-supported language and reliant on a web browser to render the application executable. Typically, to render a webpage associated with a web application, the web application and/or web browser at a client device requires access to one or more resources provided at one or more backend servers of an associated website. A resource or webpage, which may itself include multiple embedded resources, may include data records, such as content plain textual information, or more complex digitally encoded multimedia content, such as software programs or other code objects, graphics, images, audio signals, videos, and so forth. One prevalent markup language for creating web pages is the Hypertext Markup Language (HTML). Other common web browser-supported languages and technologies include the Extensible Markup Language (XML), the Extensible Hypertext Markup Language (XHTML), JavaScript, Cascading Style Sheet (CSS), and, frequently, Java. By way of example, HTML enables a page developer to create a structured document by denoting structural semantics for text and links, as well as images, web applications and other objects that can be embedded within the page. Generally, a web page may be delivered to a client as a static document, however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

Typically, a web browser used to access a webpage (or other structured document) for rendering at a client device, obtains the required resources (e.g., in response to executing JavaScripts or other calls embedded in a requested and received structured document and which may include HTML or XML code and/or JavaScript scripts and/or content including text, audio, and video) for rendering the webpage from one or more servers and then constructs a browser representation of the webpage. In particular embodiments, the browser representation may be a Document Object Model (DOM) representation of the webpage. The web browser then renders the page in the particular client viewing window of the browser utilizing the DOM (or other suitable) representation. By way of background, the DOM is an application programming interface (API) for, by way of example, valid HTML and well-formed XML documents. A DOM representation of a structured document defines the logical structure of the document as well as the way the document is accessed and manipulated. The structure of a DOM representation is generally based on an object structure that closely resembles the logical structure of the document (e.g., webpage) it models. The DOM representation is generally hierarchical in nature. More particularly, by way of example, a DOM representation typically has a logical structure that resembles a tree or group of trees each having branches that link DOM nodes of a plurality of DOM levels. In such a manner, a given DOM node at one DOM level of the DOM hierarchy may have (hereinafter also "include," "comprise," or "be associated with") one or more "child" nodes each logically arranged in a lower child DOM level, that, in turn, each have one or more of their own child nodes logically arranged in a still lower grandchild DOM level. As those of skill in the art will appreciate, as one proceeds logically through the hierarchy to lower DOM levels, the corresponding DOM nodes in those lower levels become more detailed in their representation of ever-smaller logical portions of the corresponding structured document. In this way, all the text and other content specified in the underlying HTML and/or other code is translated by the browser into DOM nodes or elements of finer and finer granularity. By way of example, at a first level, the entire document (page) may be represented by a DOM root node. Progressing down the tree, the document may include a picture, video, interactive window, block of text, and/or other content including scripts and various calls to APIs represented in finer and finer detail by subsequent level nodes. In a particular implementation, the slide-generating application effectively operates in conjunction with a canvas element of the underlying HTML (e.g., canvas element specified as part of HTML 5).

In particular example embodiments, a client device 30 is configured to access a particular target webpage over one or more networks via a web browser, create a slide object with the slide-generating application, and then associate the slide object with the webpage or to particular target content within the web page, the user/creator of the slide object, as well as selected recipient users (if any have been selected) of the slide object. In one implementation, server 22 is configured to store the slide object (e.g., within the server 22 or via data store 24) as well as positional data corresponding to the slide object, and subsequently retrieve the stored slide object and the positional data in response to a request from a slide-generating application corresponding to a second user. It should be noted that, in particular example embodiments, a second user recipient may have no knowledge of the request; that is, the second user may access a target webpage to which a slide object has been previously associated, and, upon accessing the target webpage via the second user's web browser from one or more target servers, the slide-generating application corresponding to the second user sends the request to server 22 for the particular slide object to be rendered in conjunction with the rendering of the target webpage.

In some example embodiments, each registered user of a slide-generating application has a personal home page associated with networking system 20 stored at server 22 (e.g., with the user's user profile). By way of example, a user's personal home page may provide access to self-generated slide objects, slide objects generated by other users, or a group of slide objects associated with the same webpage content. In a particular implementation, users can independently alter slide object content by logging in to their respective personal home pages and accessing the content of any particular slide object. By way of example, the creation of a slide object with the slide-generating application may include placing the slide object at a specific positional location over the currently rendered (e.g., target) webpage and setting the specific positional location to the positional data. The specific positioning or anchoring of slide objects to particular associated target webpage content will be explained in more detail below. In a particular embodiment, server 22 and/or data store 24 is configured to serve as a repository of various public webpages and/or personal home pages as well as slide objects associated with various example embodiments.

In particular embodiments, the slide-generating application is operative to capture data, or cause data to be captured, for use by the slide-generating application, including one or more of: the URL of a requested target webpage, anchoring data (hereinafter referred to as anchor point definitions) describing an anchor point from which content of an associated slide object is to be rendered, an access control list (ACL), a slide object's identity number, and user-generated content corresponding to the slide object(s), and subsequently transmit or cause to be transmitted this data to server 22 and/or data store 24. The ACL provides a list of all users that have been allocated read and/or write permission for individual user-generated slide objects. The ACL may identify users individually or in relation to user groups. For example, when commenting or overlaying slide objects on a given web page, a user may identify a set of individual users to view the slide object or identify certain groups, such as "all contacts," or a configured subset or group of contacts. The ACL associated with a particular user or slide object may then be checked against registered users of networking system 20 to determine the selected recipients of the slide objects or other data, so this data can be accessed by the permitted user(s). In this way, the database (e.g., data store) may maintain records of registered users of networking system 20 and also keep track of relationships between the registered users. In particular embodiments, this enables networking system 20 to control which users have access to which posted slide objects and may ensure that users do not see unwanted or irrelevant slide objects and that only their trusted parties (e.g., selected recipients) are able to view their slide objects. Of course, other authorization mechanisms can also be used.

Figure 2:
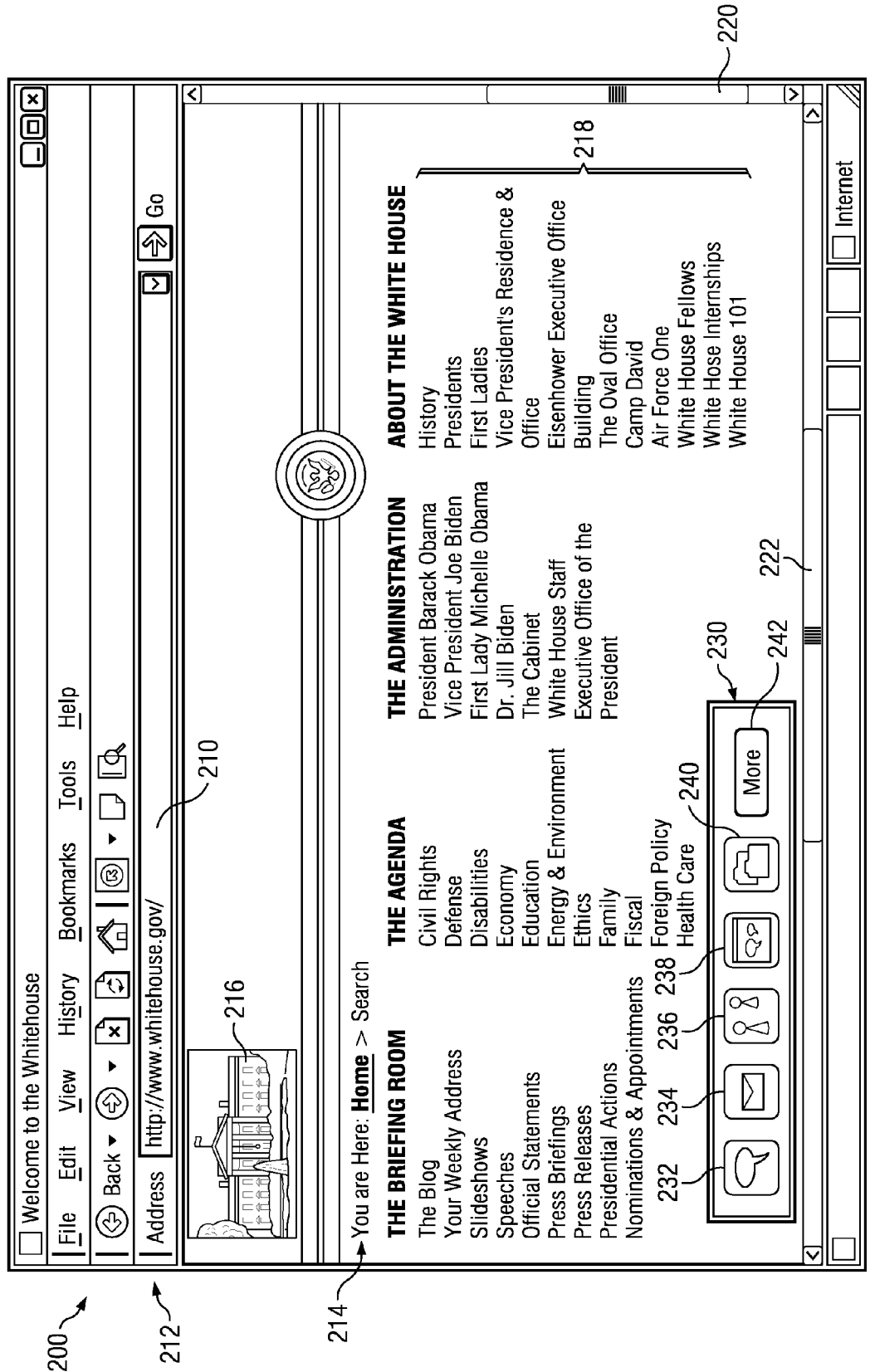
FIG. 2 illustrates a view of an example graphical user interface.

In accordance with a particular example embodiment, FIG. 2 depicts an illustration of an example graphical user interface (GUI) 200 generated by a web browser for displaying a given website, along with a slide-generating interface 230 displayed (e.g., as an overlay to GUI 200 or in conjunction with GUI 200) by, or as a result of an instruction from, the slide-generating application. In various embodiments, the GUI 200 may be implemented by a common or conventional web browser application. A web browser application is generally a computer program configured to run on a user's computing device (e.g., client device 30) that enables the user to connect to various server-hosted webpages available over a network. A non-exhaustive set of common web browsers include, by way of example, Internet Explorer™, Firefox™, Safari™, and Opera™. Referring back to FIG. 2, the web browser provides a standard viewing window 214 that displays the informational and visual content of the webpage or website (the term "website" and "webpage" may be used interchangeably herein where appropriate). The URL of the website presently being rendered and viewed is displayed in the address box 210 of the web browser GUI 200. Address box 210 enables a user to input an address (e.g., a URL) for a desired (target) webpage. The content of the website generally includes graphical images 216, text 218, and/or hyperlinks (e.g., comprising code segments that redirect the web browser and user to another portion of the webpage or to a subsequent webpage altogether without requiring manual input of the subsequent webpage's address). In various example embodiments, the webpage can also include audio, video, and other types of web content. To facilitate navigation of the rendered page, GUI 200 may include scrolling bars or buttons 220 and 222. By clicking and/or dragging these bars or buttons, a user may selectively view other portions of the webpage, which do not entirely fit the immediately viewable areas of the GUI 200 rendered by the web browser.

As described above, the slide-generating application may be implemented as a compatible plug-in to the browser software installed in a client device 30. By way of reference, a plug-in generally includes a computer program that interacts with a host application (such as a web browser) and executes in the context of the host application or as an extension to the host application to provide one or more additional functions to the user without the user exiting the host application. By way of example, the functions and features of the plug-in may be displayed to the user in such a way that they appear to be an extension of the native functionality of the host application. Plug-ins may provide additional functionality supplied and supported by third parties. Plug-ins interact with the host application through application programming interfaces. The host application supplies information through the interfaces that allow the plug-in to execute properly. There are often many advantages of using plug-ins for development and to provide services to users. Plug-ins can be developed and implemented without altering the host application. Furthermore, plug-ins can be added and deleted dynamically by the user without affecting the operation of the host application. Plug-ins can also be used to provide functionality for the host application that was not envisioned when the host application was developed. Of course, in other implementations, the content-creating and display functions described herein can be incorporated into the browser application itself or be a separate native desktop client application generally.

Slide-generating application, in one implementation, is operative to cause the web browser to display slide-generating interface 230 in the form of a graphical toolbar menu to provide the user with the slide generating functionality of particular embodiments. By way of example, slide-generating interface 230 provides an interface that enables a user to add content (hereinafter referred to as "slide content" in the form of a slide object), such as a comment, as an overlay to a currently rendered webpage (and potentially with respect to particular target content within the webpage) that will also appear as an overlay when the webpage (or the target content itself) is accessed and rendered by another user (e.g., a user selected by the slide object creator).

In various example embodiments, as will be described in more detail below, a user may, using slide-generating interface 230, highlight or otherwise select (e.g., with a cursor or input pointer via a mouse, touchpad, or other input device) a portion of text or other content from a currently rendered webpage (hereinafter also referred to as the "target structured document" or "target webpage") from which to position and anchor a slide object that embodies the slide content added by the user. In particular embodiments, the slide-generating interface 230 may include, by way of example, a 'new comment' button 232, a 'notification' button 234, a 'contacts' button 236, a 'this page' button 238, a 'settings' button 240, and a 'more' button 242. These buttons may further provide access to other options, typically organized in menu form, available to the user via the slide-generating application. For instance, in an example embodiment, the 'new comment' button 232 brings up (e.g., causes to be rendered) such options as creating a new slide object using a highlighter function ("highlighter mode") that enables a user to highlight text or images with a cursor to select an anchor point from which the slide content will be positioned (e.g., over the target content, next to the target content, or at a predetermined offset chosen by the slide object creator relative to the target content). Alternately, new comment button 232, when accessed, may provide a user with an option (e.g., with a sub-menu) to select one or more modes, including the highlighter mode just described. By way of example, a second mode for adding a slide object to particular target content may be referred to as a "target mode" in which whatever DOM node or element containing the target content (e.g., the smallest DOM node that contains the target content) the cursor is positioned over is selected as an anchor point for adding the slide object. In one example embodiment, while operating in the target mode, the target content is highlighted or otherwise visually enhanced relative to the surrounding content (e.g., the rest of the content of the target webpage may be temporarily darkened, rendered in shades of gray, or otherwise made less visible (more opaque)) thereby facilitating the positioning of an anchor point of a slide object with a desired object. This may, for example, be achieved by modifying, by the slide-generating application or in response to instruction from the slide-generating application, the Cascading Style Sheet (CSS) properties of the webpage.

In an example embodiment, the 'notification' button 234 provides the user with further options such as the option to view slide objects created by other users to which he or she has been given access. The 'notification' button 234 may allow the user to view such slide objects, similar to an "activity" page of a website, without having to login or otherwise access the particular webpages for which other users have added slide objects directly. In an example embodiment, the 'contacts' button 236 enables the user to manage the other users (e.g., "contacts" or "friends") in his or her personal ("social") network for which the user desires to share and view slide objects. The menu(s) or options associated with the contacts button 236 may include updating contact lists, forming user or comment lists, or deleting contacts. In an example embodiment, the 'this page' 238 button may provide the user with the ability to organize the viewing of slide object content and highlights on the present currently rendered page. By way of example, utilizing options found in the sub-menus of button 238, the user may be enabled to filter slide objects attached to the webpage or website, alter the look and feel of the slide objects and highlights on the webpage, scatter the slide objects, or block slide objects posted and anchored to the present webpage by the user or other users. The filtering of the slide objects and the other actions taken by the user pertaining to the presently viewed webpage can be based on a variety of methods. For instance, slide objects and highlights can be filtered by a user or by attributes shared by certain users. Also, slide objects and highlights can be filtered by time of posting or frequency of postings by the user. Other filtering methods and attributes may also be employed without limitation. In an example embodiment, the 'settings' button 240 may enable the user to update other aspects of his or her user profile, account with networking system 20, or home page. Options found in the settings sub-menu may include, by way of example and not by way of limitation, log-in and log-off options and account settings options. In an example embodiment, the 'more' button 242 allows for further options to be available to the user without necessarily taking up any more space on the display. The 'more' button may also include updateable or temporary functionality associated with example embodiments.

In a particular example implementation, slide-generating interface 230 utilizes a menu/sub-menu system. By way of example, each button in the "root menu" of slide-generating interface 230 (e.g., that which is automatically displayed to the user upon opening his or her web browser or in response to a user otherwise accessing the slide-generating application) triggers into view a submenu with the listed options and, potentially, others. These menus, in turn, may also include submenus of their own. Also, they may include selectable options, check boxes, or text boxes that allow the user to interact or configure various embodiments. However, embodiments of the present disclosure are not limited to a menu/submenu interface and can be implemented in a variety of other ways. For example, in other embodiments, the options for each of the buttons accessible with the slide-generating interface 230 may be implemented with additional toolbars. The options available under each button may be implemented with text or with graphical representations. Also, the root menu 230 and its submenus or children toolbars may be persistent or hideable. They also may be rooted somewhere on the screen or may be allowed to float around the GUI 200 of the browser without any fixed position. Furthermore, the look and feel of the menuing system, and slide-generating interface 230 in general, may be customizable by the user.

Figure 3:
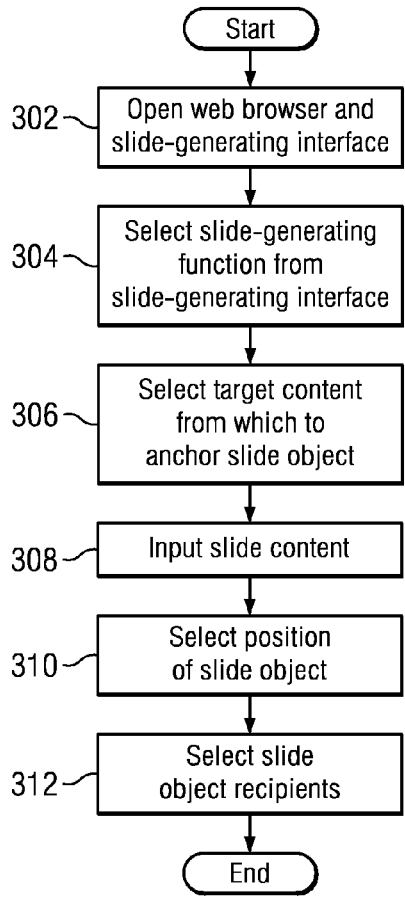
FIG. 3 illustrates a flowchart illustrating an example method for adding a slide object to a webpage.

FIG. 3 depicts a flowchart illustrating an example embodiment of a method for generating a slide object for a target webpage. The process may begin at 302 when the user opens a web browser. In one example embodiment, the slide-generating application begins running with the opening of the web browser. In such an embodiment, slide-generating interface 230 may automatically be displayed within or in relation to GUI 200. In an alternate embodiment, slide-generating interface 230 may additionally or alternately be displayed when the user affirmatively selects (e.g., by clicking an associated icon or selecting the slide-generating application from a menu) the slide-generating application regardless of whether the web browser is already opened (in one embodiment, the web browser may automatically be opened after the user opens the slide-generating application). From the slide-generating interface 230, the user selects the slide-generating function (e.g., button 232) at 304 for enabling the user to create a new slide object. The user may then select or target specific content or objects (e.g., a picture, video, window, etc.) or portions of text (e.g., a word, group of words, sentence, paragraph, etc.) within the currently rendered target webpage at 306 from which to anchor or attach a slide object as, for example, just described above with reference to the highlighter and target modes. The user may then add or input the slide content (e.g, text, an image, video, audio, or other personalized or non-native content) to be associated with the slide object at 308. The user may also select a position or offset of the slide object relative to the selected target content at 310 where the slide content will subsequently be rendered upon accessing the target webpage. In one particular embodiment, the position is stored as a set of positional coordinates and/or a set of anchor point definitions defining an anchor point and any offset. At 312, the user may select recipients for the slide object (e.g., selected ones of the user's contacts). By way of example, the slide-generating application (with or without contacting networking system 20) may present to the user a list of the user's contacts as entered or defined previously by the user (e.g., using contacts button 236 or using the user's homepage). A selected recipient, upon accessing the target webpage or, in one particular embodiment, even just accessing the target content in a similar web page which may or may not have the same URL as the target webpage (e.g., news webpages often change rapidly so the target content to which the slide object was anchored may, subsequently to its original creation, be found on a different webpage), may then view the slide object associated with the target content automatically without any additional input from the recipient.

In particular embodiments, when the user selects the slide-generating functionality accessible via slide-generating interface 230, the slide-generating application accesses the DOM (or other suitable) representation of the currently rendered target webpage generated by the web browser. In various example embodiments, the slide-generating application may also store (e.g., either locally in the client device 30 or remotely via server 22 and/or data store 24) a copy of the DOM representation of the target webpage. Using the highlighter or target modes described above, the user may select text or other objects (e.g., text blocks, images, videos, or any other target content) by highlighting or simply placing his or her cursor over the object where the user desires to anchor the slide object as described above. The former may involve the slide-generating application determining the smallest DOM node that contains the desired target content. In particular embodiments, the slide-generating application identifies a particular DOM node (e.g., the smallest DOM node or selected DOM node containing the target content, hereinafter referred to as the "target DOM node"). In particular embodiments, the slide-generating application may then call, for example, an API that provides the slide-generating application with the positional information for the target content from which to anchor the slide object.

By way of example, in a particular embodiment, the slide-generating application calls the API getBoundingClientRect executing within the web browser, which then determines the position of the underlying DOM node(s) corresponding to the target content from which to anchor the slide object. The getBoundingClientRect returns a value that may include the left, top, right, and bottom positional coordinates or properties (or the position of one corner as well as the width and height) of the box or rectangle characterizing the position of the DOM node(s) within the page layout rendered by the browser for the particular user's viewing window (e.g., size and aspect ratio of the viewing window in DOM representation). In various example embodiments, the slide-generating application is configured to render or cause to be rendered a comment box over the target webpage that will contain the slide content. In a particular example embodiment, the user may move the position of the comment box relative to the target content defined by the user. The distance vector defining the offset between the bounding box of the anchor DOM elements and the comment box can be stored in association with the slide object as well as an anchor point definition.

In particular embodiments, the slide-generating application may store or cause to be stored either locally or remotely the generated slide object including the slide content, anchor point definitions defining the positioning of the target DOM node, from which the slide object is to be anchored, as well as other information such as, by way of example, the slide creator (e.g., user responsible for making the slide object). In an example embodiment, the anchor point definitions included in the slide object may include information such as the positional coordinates and selected identifying properties of the target DOM node, as well as content related to the target DOM node, and, in particular embodiments, the positional information and selected properties of one or more neighboring DOM nodes returned by the getBoundingClientRect API relative to the particular web browser used to render the target webpage. The anchor point definitions may also include any deliberate offset (e.g., in pixels) chosen by the user between the slide object and the underlying anchor object (e.g., the target DOM node and the one or more neighboring DOM nodes).

After the user defines a given slide object, the slide-generating application may modify or cause to be modified the DOM representation of the target webpage (without necessarily modifying the native HTML or other markup language code or content transmitted to the browser for rendering the target webpage (which is generally stored separately)) to include the slide object(s) generated by the user for immediate viewing by the user. In addition, as described above, the slide object data may also be transmitted to a central database (e.g., data store 24) or other remote hosts for display via web browsers and slide-generating applications operating at other client devices 30 of other users as they encounter the same underlying target webpage. Still further, in some embodiments, server 22 may also access the database of slide objects to publish a content-creating activity feed when users access webpages corresponding to the service provided by networking system 20. For example, when a user accesses the his or her account home page, server 22 may access a database of slide objects at data store 24 and assemble a feed of slide objects where the user is identified in an ACL or otherwise allowed to view the slide objects. By way of example, the feed can be restricted to the latest N created or modified slide objects. Other filters can also be used as well. Accordingly, a registered user of networking system 20 need not use the slide-generating application to view slide objects creating by the user or other users (e.g., created by the user's contacts as well as other users). In addition, a user, accessing a web page for which one or more slide objects have been associated, may be enabled to respond to slide objects presented to the user by accessing a slide object within the context of the activity feed page. For example, using AJAX or similar technologies, the user can select a given slide object and add content in response to one or more comments or other content associated with the slide object.

Figure 4:
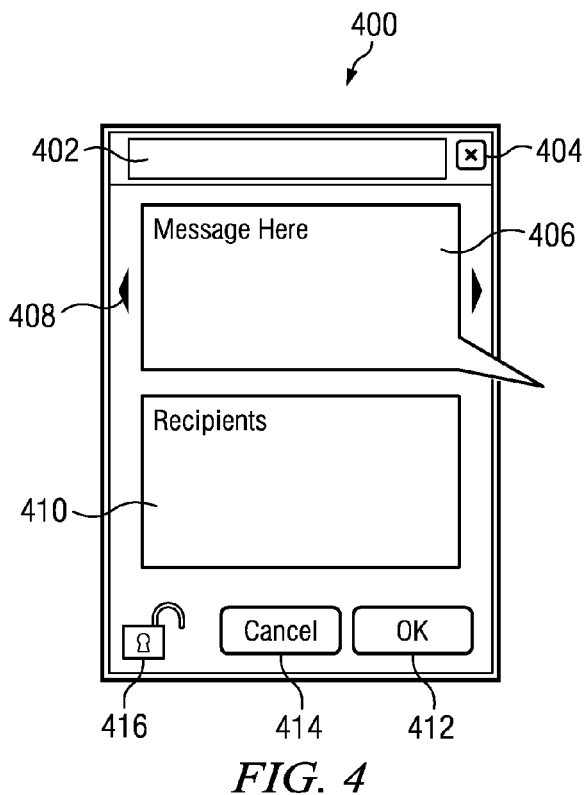
FIG. 4 illustrates an example graphical interface component of a slide-generating application in accordance with an embodiment.

FIG. 4 illustrates a slide object generation interface 400 in accordance with a particular example embodiment. By way of example, slide object generation interface 400 may be rendered by the slide-generating application in response to a user selecting new comment button 232. In an example embodiment, slide object generation interface 400 may include title text box 402 that enables the user to give a particular slide object a name or title. Slide object generation interface 400 may also include a button 404 that provides an option to the user for canceling the generation of the slide object and eliminating the interface 400 from the display. In the illustrated embodiment, body text box 406 enables the user to input the body of his or her comment or message. Text box 406 may also enable the user to input other content alternately or in addition to text including, by way of example, hyperlinks, graphical representations, drawings, images, audio clips, or video. In an alternate embodiment, slide object generation interface 400 may include a separate box or sub-interface for inputting non-text slide content. Slide object generation interface 400 may also include tabs 408, shown on either side of the slide (or message box), that enable the user to scroll back and forth and view other parts of the message not presently viewable in the text box 406 (e.g., due to the size or aspect ratio of the text box). In particular, such a feature may greatly facilitate the user's ability to alter the text of the message or to proofread the message. In recipient text box 410, the user is able to create the list of recipients for the slide object. Alternately, slide object generation interface 400 may present a list (e.g., a drop-down list) of potential recipients (e.g., the user's contacts) or groups of recipients from which the user may select desired recipients. The selected recipients, as described above, are the other users, that when accessing the target webpage or their respective home pages, will be able to see the slide content once the slide object is successfully completed. In the illustrated embodiment, when the user is finished with the slide object and has selected the recipients, the user may select the OK button 412 to finalize the slide object and cause the slide-generating application to transmit the slide object to networking system 20 so that it may be accessed by other slide-generating applications for use in rendering the slide object for viewing by the selected recipients. In an example embodiment, once the slide object is generated and/or transmitted to networking system 20, the slide object generation interface 400 is no longer displayed. If the user wishes to cancel the slide object, the user may select a cancel button 414. Similarly, once the cancel button is selected, the interface 400 may no longer be displayed. In the illustrated embodiment, a lock button 416 gives the author of the slide object control over how others (e.g., the selected recipients) can interact with the slide object when rendered at their respective client devices. In particular embodiments, if the slide object is locked, no other user can alter or add to it. Conversely, if the slide object is unlocked, other users may be free to add to it once it is posted to networking system 20.

The features just described and illustrated with reference to FIG. 4 are not meant to be limiting. Additionally, in some embodiments, not all features shown may be present. Furthermore, other features may be present in the slide object generation user interface 400. In one example embodiment, the body text box 406 may house features common in text authoring programs such as spell check and grammar check. The body text box 406 may also include features that allow for formatting of the text or include special effects such as smiley faces, among others. Additionally, a user may be able to modify the slide object's visual transparency relative to the underlying HTML content of the page using one or both of interfaces 232 and 400. By way of example, the slide-generating application residing at the user's or recipient's client devices may modify the CSS properties of the rendered slide object such that the slide content of the slide object when overlaid over the target webpage is partially transparent enabling viewing of the underlying native content of the target webpage. One or both of interfaces 232 and 400 may also provide a toggle function that enables users, including the slide object creator and/or recipients, to toggle slide objects on and off when viewing target webpages for which the slide objects have been generated and associated; that is, to selectively show and not show one or more slide objects associated with a given target webpage or in general (this may be achieved by modifying the opacity of the slide content using CSS properties). As described above, in additional or alternate embodiments, text box 406 may include options for posting multimedia comments or content. These options may enable a user to record an audio and/or a video clip, for example, or allow the user to insert multimedia content out of one or more saved files of various types and formats. As another example, recipient box 410 may also include auto-complete capability for other users in the user's contacts list or a look-up directory for users. The lock button 416 may also be implemented with additional functionality. By way of example, through additional menus, the user may be able to lock the slide content for some users but not for others. Furthermore, the layout of the slide object creation user interface may take a variety of forms and may be customizable by the user.

Figure 5:
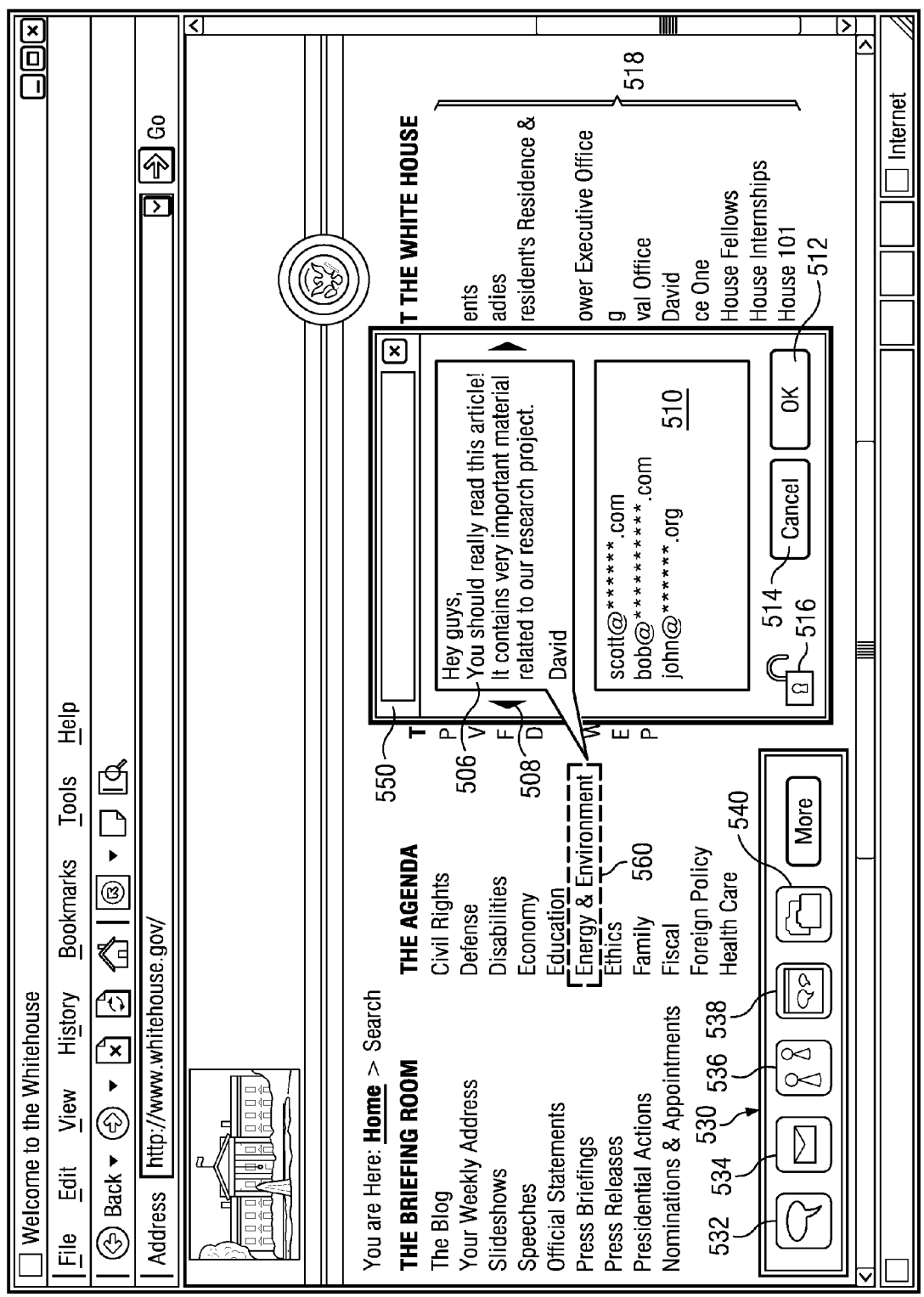
FIG. 5 illustrates an example graphical user interface showing a slide object generation interface for creating a slide object as an overlay to a target webpage.

FIG. 5 illustrates an example web browser screenshot 500 in accordance with an embodiment in which a user is adding a slide object including a comment to a webpage. The screenshot 500 includes a typical browser view of a webpage complete with hyperlinked text 518. In the illustrated embodiment, slide-generating interface 530 is shown in the form of a toolbar in the lower left hand corner of the main viewing window 500 of the browser. The toolbar may include several buttons such as, by way of example, a 'new comment' button 532, a 'notification' button 534, a 'contacts' button 536, a 'this page' button 538, a 'settings' button 540 and a 'more' button as, for example, described with reference to FIG. 2. In the illustrated embodiment, slide object generation interface 550 is also displayed, superimposed over the webpage. Slide object generation interface 550 includes the body text box 506 along with scrolling tabs 508, the recipient text box 510, OK button 512, Cancel button 514, and Lock button 516.

In the illustration, text has already been typed in the body text box 506 and the recipients are already listed in the recipient box 510. FIG. 5 also illustrates a method of placement for the comment used in an example embodiment. In this particular example, the comment of the slide object is directed to the text "Energy & Environment" 560, located on the webpage. Once the slide object generation interface 550 is displayed in the browser window 500, the user can position it anywhere within the browser window. By way of example, by lining up the tip of the message box 506 with the right-hand side of the Energy & Environment text 560, the user may ensure that the completed slide content (comment) will by tied or anchored to that portion of the text (e.g., to the underlying target DOM node) when the webpage is viewed later by him or herself or other users viewing the page. However, various embodiments are not limited to this technique of slide object placement as other techniques can also be used alternatively or in addition to the technique just described.

Figure 6:
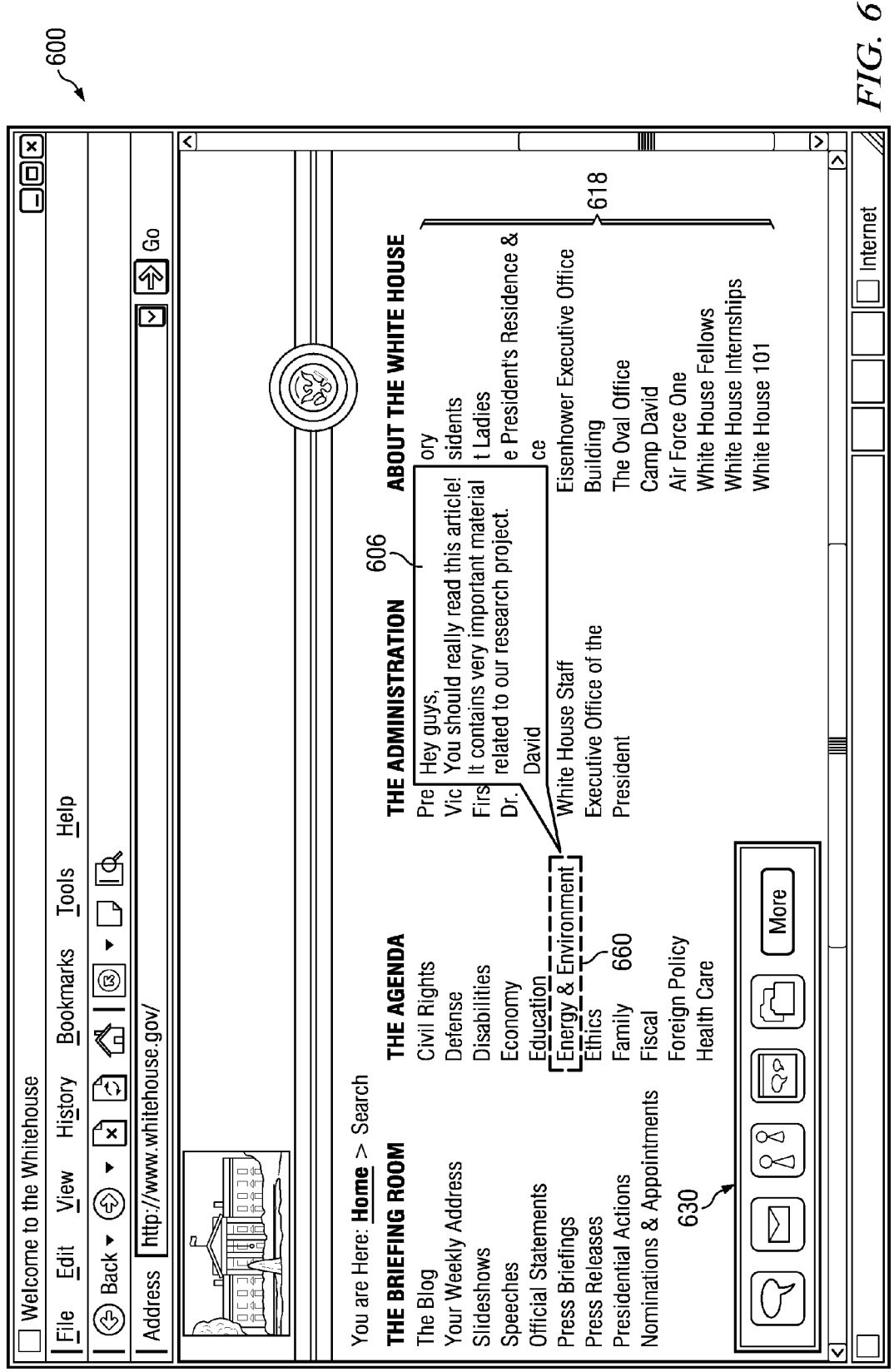
FIG. 6 illustrates an example graphical user interface showing a slide object rendered as an overlay to an associated target webpage.

FIG. 6 shows an example screenshot 600 of an example webpage presented in a browser along with slide content (comment) 606 and the slide-generating interface toolbar 630 in accordance with an example embodiment. In the illustrated embodiment, the webpage displayed in the viewing window 600 of the browser also includes hyperlinked text 618. In the illustration, a slide object is anchored to the "Energy & Environment" text 660 shown in the middle of the viewing window 600.

Figure 7:
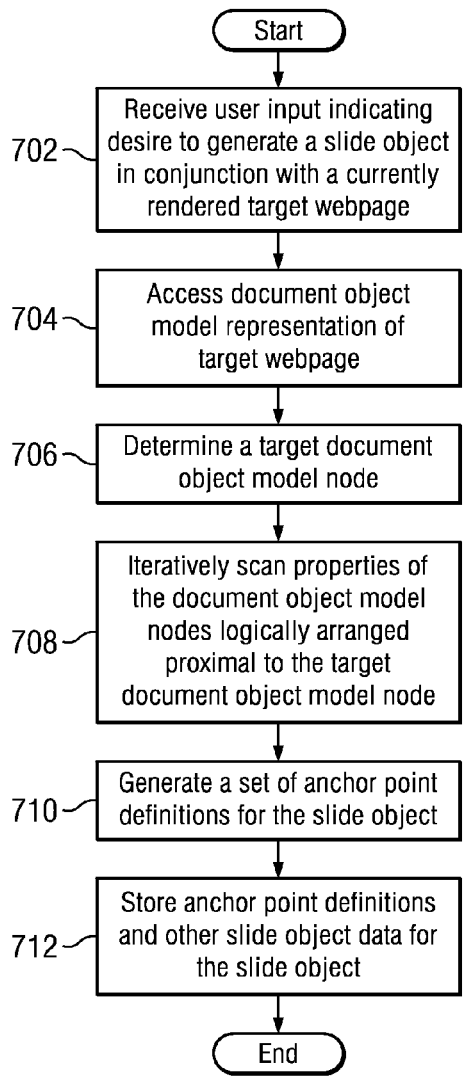
FIG. 7 shows a flowchart illustrating an example method or process for anchoring a slide object to a target webpage or, specifically, to target content within the target webpage.

FIG. 7 shows a flowchart illustrating an example method or process for anchoring a slide object to a target webpage or, specifically, to target content within the target webpage. In an example embodiment, the method begins in response to a user input at 702 indicating to the slide-generating application residing in a client computing device (e.g., client device 30) the user's intent to generate a slide object in connection with a target webpage rendered by a first client application (e.g., a web browser) executing within the client computing device. More particularly, the user input may indicate the user's desire to generate and associate a slide object with particular target content of the target webpage. By way of example, the user input may include the selection of new comment button 232 illustrated and described with reference to FIG. 2.

In an example embodiment, the process then proceeds with accessing at 704, by the slide-generating application at the user's client device, a document object model (DOM) representation of the currently rendered (target) webpage generated and temporarily stored by the web browser. As described above, in one particular embodiment, the slide-generating application stores (at least temporarily) a copy of the DOM representation locally at the client device and/or remotely via server 22 and data store 24. As is also described above, the DOM representation of the target webpage generally includes a plurality (e.g., tens, hundreds, thousands or more) of DOM nodes each logically arranged in one of a plurality of DOM levels that together logically form a DOM hierarchical tree.

At 706, the slide-generating application determines a target DOM node (or set of target DOM nodes) that includes the target content for which the user is generating the slide object. The target DOM node serves as an anchor point from which to anchor the generated slide object. That is, when a another ("second") user subsequently accesses the target webpage, and particularly the target content, the slide-generating application at the second user's client device is configured to recognize that a slide object is associated with the target webpage, access networking system 20 to obtain the slide object, access the DOM representation generated by the web browser at the second user's client device, identify a corresponding target DOM node within the DOM representation generated by the web browser at the second user's client device, and modify the DOM representation of the target webpage at the second user's client device to cause the slide object content to be rendered at the second user's client device at a predetermined position relative to the target content defined by the corresponding target DOM node.

By way of example, in a highlighter mode, as described above, the user input may include a highlighting of the target content within the target webpage currently rendered by the web browser. In this case, determining a target DOM node may include determining a lowest level DOM node that comprises the highlighted target content and selecting the lowest level DOM node as the target DOM node. As another example, in a target mode, as described above, the user input may include a positioning of a cursor or input pointer over the target content. In this case, determining a target DOM node may include determining a lowest level DOM node associated with the target content under the cursor or input pointer and selecting the lowest level DOM node as the target DOM node. Generally, the user input may include any user input or combination of user input that indicates a desire by the user to cause a slide object (and particularly the slide content of the slide object) to be rendered as an overlay to the target webpage. Thus, determining a target DOM node may generally include determining a most relevant DOM node corresponding to the slide content of the slide object and selecting the most relevant DOM node as the target DOM node. By way of example, determining the most relevant DOM node may include determining the nearest DOM node relative to a current position of a cursor or input pointer and/or determining the DOM node that comprises all or a portion of the target content most relevant to the slide content of the slide object.

In particular embodiments, the slide-generating application also recursively scans (sequentially or in parallel), at 708, one or more properties of each of one or more of the DOM nodes logically arranged proximal to the target DOM node within the DOM hierarchical tree. By way of example and not by way of limitation, one or more selected properties scanned for each of the target DOM node or the selected scanned DOM nodes may include a DOM node type identifier (nodeType), a DOM node name (nodeName), a DOM node value (nodeValue), or an image or other data source identifier or address. Generally, the DOM properties of interest in particular embodiments of the present disclosure are DOM properties determined to change relatively infrequently. In this way, even if the target webpage is subsequently modified after the generation of a slide object, a corresponding target DOM node can still be identified from which to anchor the slide object.

At 710, the slide-generating application generates a set of one or more anchor point definitions for the slide object based on one or more selected properties of each of the target DOM node and one or more selected ones of the scanned DOM nodes. The slide-generating application may then store, or cause to be stored, at 712, the set of anchor point definitions in a data structure locally as well as remotely at networking system 20 (e.g., via server 22 in data store 24) with other slide object data for the slide object. By way of example, the anchor point definitions may include the URL or network domain of the target webpage and selected properties of each of the target DOM node and the selected scanned DOM nodes in addition to structural information that defines the structural relationships between the target DOM node and the selected scanned DOM nodes within the particular DOM representation of the target webpage generated by the particular web browser. In a particular embodiment, the anchor point definitions, and particularly the selected properties of the selected DOM nodes and data defining their logical relationships, are serialized into a data string (or otherwise marshaled using any suitable format) prior to storage at the client device and/or remotely at networking system 20. Storing the properties as a data string may be useful when subsequently attempting to identify a corresponding target DOM node when the target webpage is later accessed as will be described in more detail below with reference to FIG. 10.

Additionally, it should be noted that, in particular embodiments, not all of the scanned DOM nodes, and specifically their corresponding properties, will be used to generate the anchor point definitions. By way of example, referring to FIG. 9, which illustrates the same portion of the DOM tree illustrated in FIG. 8, only the DOM nodes illustrated with solid lines are selected for inclusion when generating the anchor point definitions, while the DOM nodes illustrated with dotted lines are not. Hereinafter, the selected DOM nodes included in the anchor point definitions may be referred to in the context of a target DOM environment. Such choosing of selected properties of selected DOM nodes optimizes the generating and subsequent retrieval and rendering of the slide objects, because irrelevant data is not stored (thereby reducing memory and transmission requirements). This also simplifies and expedites identification of a corresponding target DOM node when the target webpage is subsequently accessed.

Figure 8:
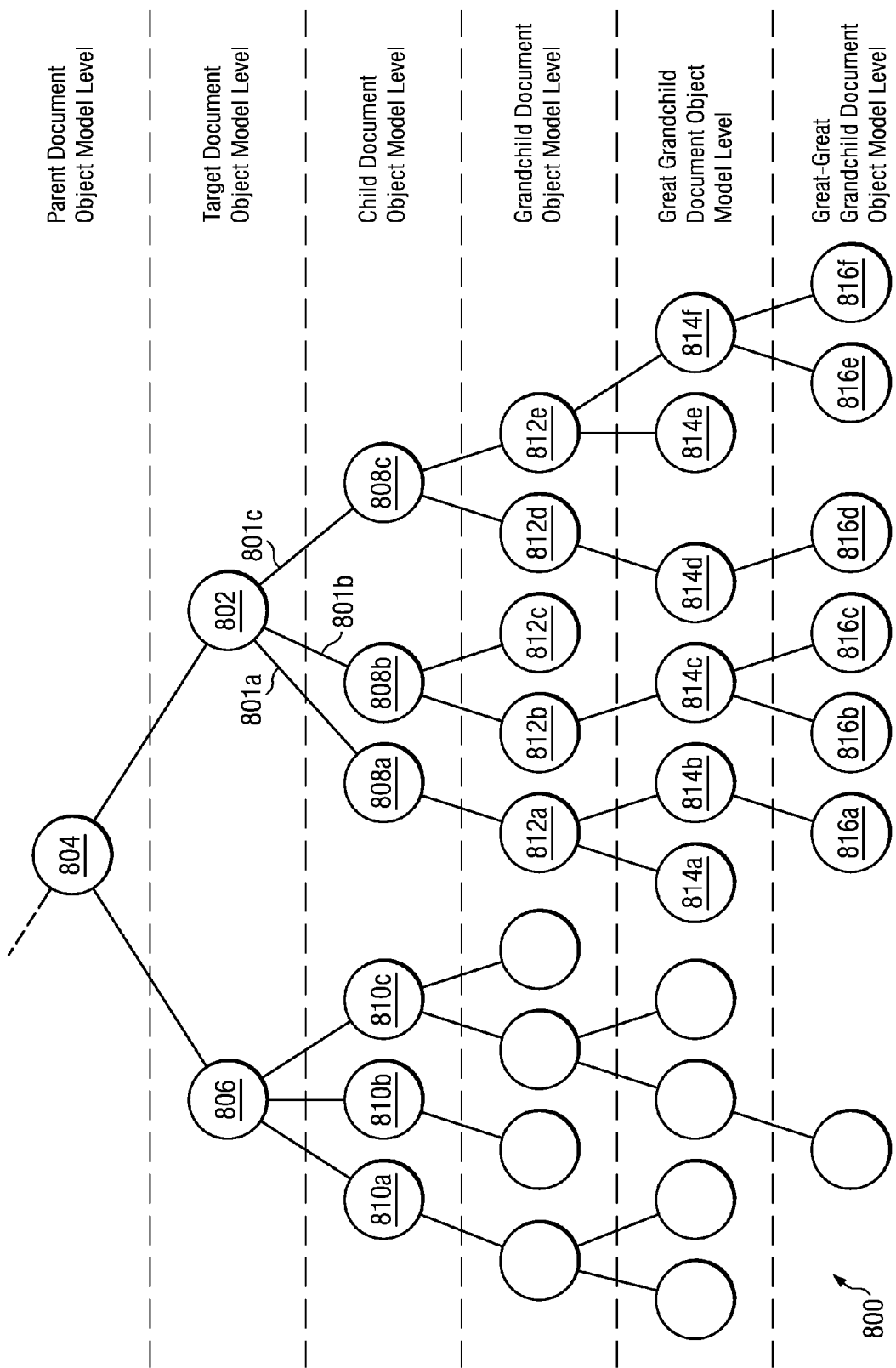
FIG. 8 illustrates a diagrammatic graphical representation of a portion of an example Document Object Model (DOM) hierarchical tree.
Figure 9:
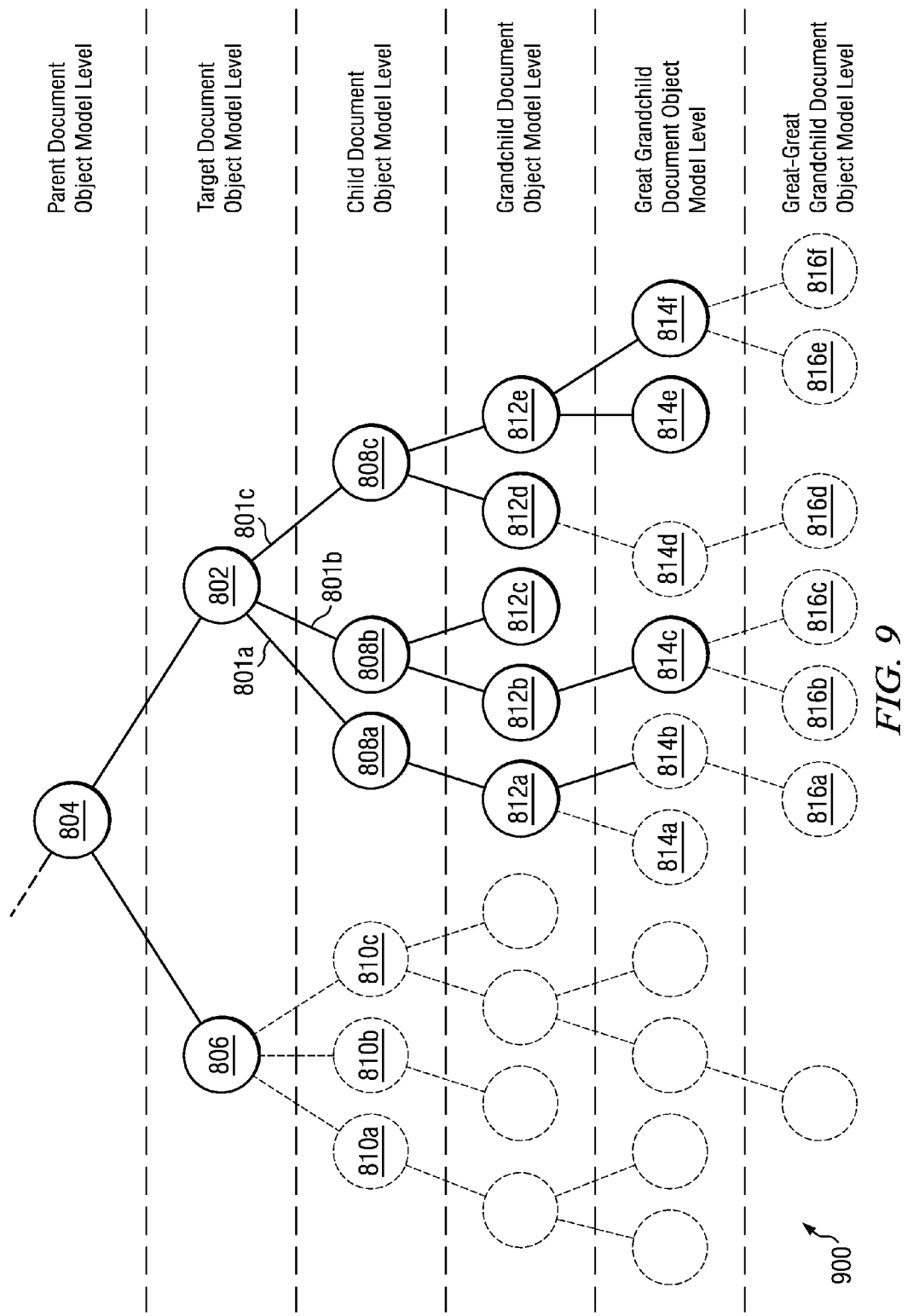
FIG. 9 illustrates a target DOM node environment with the DOM hierarchical tree of FIG. 8.

In one example embodiment, recursively scanning one or more properties of each of one or more of the DOM nodes logically arranged proximal to the target DOM node within the DOM hierarchical tree may include traversing one or more logical branches of the DOM hierarchical tree originating from the target DOM node or from which the target DOM node is arranged. For didactic purposes, FIG. 8 illustrates a diagrammatic graphical representation of a portion of an example DOM hierarchical tree 800 including target DOM node 802, parent DOM node 804, sibling DOM node 806, child DOM nodes 808 and 810, grandchild DOM nodes 812, great-grandchild DOM nodes 814, and great-great-grandchild DOM nodes 816. Traversing the logical branches of the DOM tree may include recursively scanning one or more properties of each of one or more of the DOM nodes logically arranged along each of the logical branches sequentially from a target DOM level corresponding to the target DOM node down the respective logical branch through one or more DOM levels logically below the target DOM level.

In such an embodiment, generating a set of one or more anchor point definitions based on one or more selected properties of each of the target DOM node and one or more selected ones of the scanned DOM nodes may include, for each of one or more of the logical branches, identifying one or more properties of each of one or more DOM nodes along the logical branch until one or more DOM nodes along the logical branch are each scanned and determined to comprise at least a predetermined number of suitable selected properties (e.g., based on one or more corresponding properties of the target DOM node); that is, until a DOM node is reached that includes a suitable number of properties (e.g., 2, 3, 5, 10, or other suitable number) that are sufficient to facilitate identifying the target DOM node from a DOM representation generated by another web browser. By way of example, the slide-generating application may determine that DOM node 812a within the grandchild DOM level contains a suitable number of selected properties along branch 801a, and hence does not scan any additional nodes below the grandchild DOM level along branch 801a. However, the slide-generating application may determine that the DOM nodes within the grandchild DOM level along branches 801b and 801c do not contain a suitable number of selected properties. By way of example, the slide-generating application may determine that DOM node 814c along branch 801b contains a suitable number of selected properties while DOM nodes 814e and 816f contain a suitable number of selected properties along branch 801c.

In a particular embodiment, the DOM nodes logically below the DOM nodes determined to comprise at least the predetermined number of suitable selected properties are not scanned. In this case, the set of anchor point definitions are based at least in part on the suitable selected properties and structural information corresponding to selected ones of the scanned DOM nodes along the logical branches, but only down to the node(s) that contain at least the predetermined number of suitable selected properties. In one example embodiment, the predetermined number of suitable selected properties for a particular DOM node is dependent at least in part on the DOM node type of the particular DOM node. That is, the particular selected properties scanned for a particular DOM node, as well as the number of selected properties determined to be suitable, may be chosen based on the type of the particular DOM node (e.g., an element node, an attribute node, a text node, a comment node, etc.), and may be statically predetermined or dynamically determined. Furthermore, the predetermined number of suitable selected properties for a given DOM node may also depend on the relation of the DOM node to the target DOM node (e.g., a sibling, child, grandchild, or parent DOM node may each have a different predetermined number of suitable selected properties).

In particular embodiments, recursively scanning one or more properties of each of one or more of the DOM nodes logically arranged proximal to the target DOM node within the DOM hierarchical tree may additionally include scanning one or more properties of one or more selected DOM nodes that each comprise the target DOM node including, by way of example, parent DOM node 804. In such embodiments, the set of anchor point definitions are further based on the selected properties and structural information corresponding to the selected scanned DOM nodes that each comprise the target DOM node. Additionally, one or more properties of one or more sibling DOM nodes 806 and child DOM nodes 810 may also be scanned and used to generate the set of anchor point definitions. In some cases, sibling DOM nodes of the parent DOM node 804 (e.g., DOM nodes within the parent DOM level that themselves share a "grandparent" DOM node above the parent DOM level) as well as child DOM nodes originating from such sibling DOM nodes of the parent DOM node 804 (e.g., "cousin" DOM nodes) may also be scanned. Generally, the slide-generating application may scan any suitable DOM nodes that the slide-generating application determine would facilitate the subsequent identification of a corresponding target DOM node when the target webpage is later accessed by the user or a selected recipient of the slide object.

Figure 10:
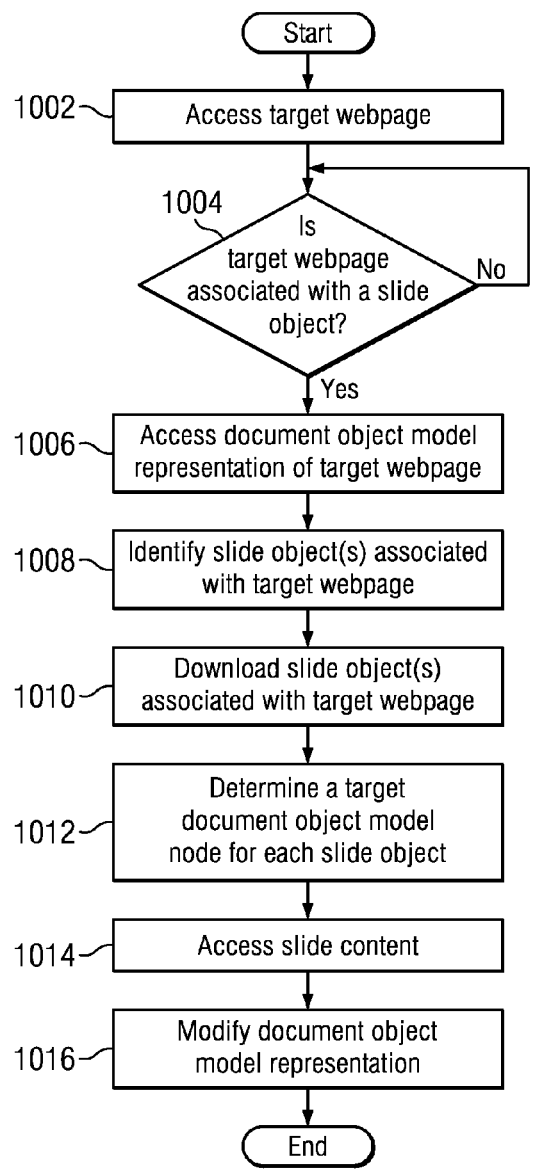
FIG. 10 shows a flowchart illustrating an example method or process for rendering a slide object in conjunction with the rendering of a target webpage or, specifically, of target content within the target webpage, for which the slide object has been previously generated and associated.

FIG. 10 shows a flowchart illustrating an example method or process for rendering a slide object in conjunction with the rendering of a target webpage or, specifically, to target content within the target webpage, for which the slide object has been previously generated and associated. In a particular example embodiment, the process begins with the accessing, at 1002, of a target webpage by a web browser operating at a client device. As described above, when a webpage is requested and HTML or other markup language content is received by the web browser to render the webpage, the web browser first constructs a corresponding DOM representation of the underlying web content from which to render the webpage. In particular embodiments, in parallel with the DOM construction or the rendering by the web browser, the slide-generating application determines if the target webpage is associated with a slide object at 1004. By way of example, the slide-generating application may access and query networking system 20 as to whether any slide objects stored at networking system 20 for which the user has been designated as a recipient are associated with a URL (or a sub-string or pattern thereof) that matches the URL (or a sub-string or pattern thereof) of the target webpage. In an alternate embodiment, the slide-generating application may also determine whether one or more aspects of the target webpage match a set of anchor point definitions of one or more slide objects stored at networking system 20 in addition to, or in lieu of, a URL matching process. The slide-generating application may also query local memory at the client device to check whether any slide objects that have been stored locally are associated with the target webpage.

If it is determined that there are one or more slide objects associated with (e.g., anchored to) the target webpage, the slide-generating application may then access the DOM representation of the target webpage at 1006, otherwise, if there are no slide objects associated with the target webpage, the method ends (e.g., the slide-generating application waits for the web browser to access another webpage). In an example embodiment, the slide-generating application then accesses networking system 20 to identify, at 1008, which slide objects stored at networking system 20 are associated with the target webpage based on their corresponding anchor point definitions. For each of the slide objects identified as being associated with the target webpage, the slide-generating application downloads the slide object including the slide content and corresponding anchor point definitions at 1010.

The slide-generating application then analyzes the corresponding set of anchor point definitions and, in conjunction with analyzing the DOM representation of the target webpage, determines, at 1012, a target DOM node of the DOM representation from which to anchor the slide object. By way of example, this determination at 1012 may be performed prior to, in parallel with, or after the target webpage is rendered by the web browser (this step may also be continuously or periodically performed during a user's browsing session).

In one simple case, e.g., where the DOM node from which the slide object was originally anchored is an image DOM node (a DOM node that defines an image), the slide-generating application may only analyze DOM nodes from the DOM representation that are themselves image DOM nodes when determining a corresponding target DOM node thereby optimizing the determination and saving time and other resources. A more general process for determining a target DOM node will now be described. As described above, each set of anchor point definitions includes one or more properties for each of a plurality of DOM nodes corresponding to the DOM representation of the webpage for which the slide object was originally generated, hereinafter referred to as "test" DOM nodes with reference to the embodiments described in conjunction with FIG. 10. The test DOM nodes, as described above, include a test target DOM node (from which the slide object was originally anchored) and one or more test environment DOM nodes (e.g., the selected scanned DOM nodes described in conjunction with FIG. 7). As described above, the anchor point definitions further define logical structural relationships between each of the test DOM nodes. In particular embodiments, the plurality of test DOM nodes, the corresponding properties of the plurality of test DOM nodes, and the logical structural relationships between each of the plurality of test DOM nodes together define a test DOM environment around and including the test target DOM node. In particular embodiments, determining a target DOM node for a slide object includes determining the DOM node from the DOM representation of the target webpage that most closely matches the test target DOM node and selecting that DOM node as the target DOM node.

In one example embodiment, determining the DOM node that most closely matches the test target DOM node includes, for each DOM node of the DOM representation, setting the DOM node as a candidate target DOM node. The slide-generating application then compares the test DOM environment with a candidate DOM environment of DOM nodes around and including the candidate target DOM node based on the properties and logical structural relationships of the test DOM nodes in the test DOM environment and properties and logical structural relationships corresponding to the DOM nodes in the candidate DOM environment. In particular embodiments, the slide-generating application then generates a matching score for the candidate DOM node based on the comparison. In a particular embodiment, the slide-generating application then compares the matching score to a predetermined threshold value and, if the matching score is greater than the predetermined threshold value, selects the candidate target DOM node as the target DOM node. In another particular embodiment, the slide-generating application, for each DOM node of the DOM representation, compares the matching score to a predetermined threshold value and, if the matching score is greater than the predetermined threshold value, identifies the candidate target DOM node as a probable target DOM node. The slide-generating application then selects the probable DOM node having the highest matching score as the target DOM node.

As described above, in one example embodiment, the properties and logical structural relationships corresponding to the DOM nodes in the test DOM environment are serialized into a data string. Similarly, the properties and logical structural relationships corresponding to the DOM nodes in the candidate DOM environment may be serialized into a second data string. In one particular embodiment, comparing the test DOM environment with the candidate DOM environment includes computing a Levenshtein distance between the data string corresponding to the test DOM environment and the second data string corresponding to the candidate DOM environment. In such as embodiment, the matching score is based at least in part on the computed Levenshtein distance. By way of reference, in information theory and computer science, the Levenshtein distance is a metric for measuring the amount of difference between two sequences (i.e., the so called edit distance). The Levenshtein distance between two strings may be given by the minimum number of operations needed to transform one string into the other, where an operation is an insertion, deletion, or substitution of a single character. Other matching algorithms can also be used, such as stemming, n-gram, etc.

Additionally, in some embodiments, properties associated with particular DOM nodes within the test or candidate DOM environments may be weighted differently based on, for example, the type of the particular DOM node and/or its structural relationship relative to the corresponding target DOM node. By way of example, properties associated with a child DOM node (e.g., 808*a*, *b*, or *c*) may be weighted higher than properties associated with a sibling DOM node (e.g., 806), or properties of a DOM node that includes an image may be weighted higher than properties of other DOM nodes. Higher weighted properties may have a greater bearing determining whether particular DOM nodes or DOM node environments match.

Referring back to FIG. 10, the process may then proceed with accessing, by the slide-generating application at 1014, the slide content corresponding to the slide object and modifying, at 1016, the DOM representation of the target webpage such that the web browser renders the slide content corresponding to the slide object as an overlay to the target webpage at a predetermined position relative to target content defined by the target DOM node based on the corresponding set of anchor point definitions. By way of example, the anchor point definitions or other slide object data may include a predetermined offset specified by the author of the slide object. In such case, the DOM representation may be modified such that the slide content is positioned at the predetermined offset relative to the target content.

More particularly, by way of example, in response to a determination of a target DOM node, the slide-generating application may call getBoundingClientRect to retrieve the positional coordinates of the bounding box(es) surrounding the target DOM node based on the current size and aspect ratio of the current browser viewing window. The slide-generating application then modifies the DOM representation to cause the slide content of the slide object to be rendered as an overlay to the target webpage content in the position specified after querying the getBoundingClientRect API and in conjunction with any stored and retrieved offset specified by the slide object creator and potentially in conjunction with a border of the viewing window (e.g., the position of the displayed slide content may change based on the current position of the rendered target content relative to the border of the viewing window).

It should be noted that, in some example embodiments, when the client viewing window is resized or re-shaped, the slide-generating application may re-query the web browser (and the getBoundingClientRect API) to retrieve the new DOM coordinates of the target DOM node anchor point. However, scrolling or otherwise traversing a given page rendered in the client viewing window generally doesn't change the DOM representation, and hence, the slide-generating application does not have to re-query the web browser for new DOM coordinates. More specifically, when a webpage is rendered within a particular client viewing window, the entire page is translated into a DOM representation, not just the rendered portion.

Figure 11:
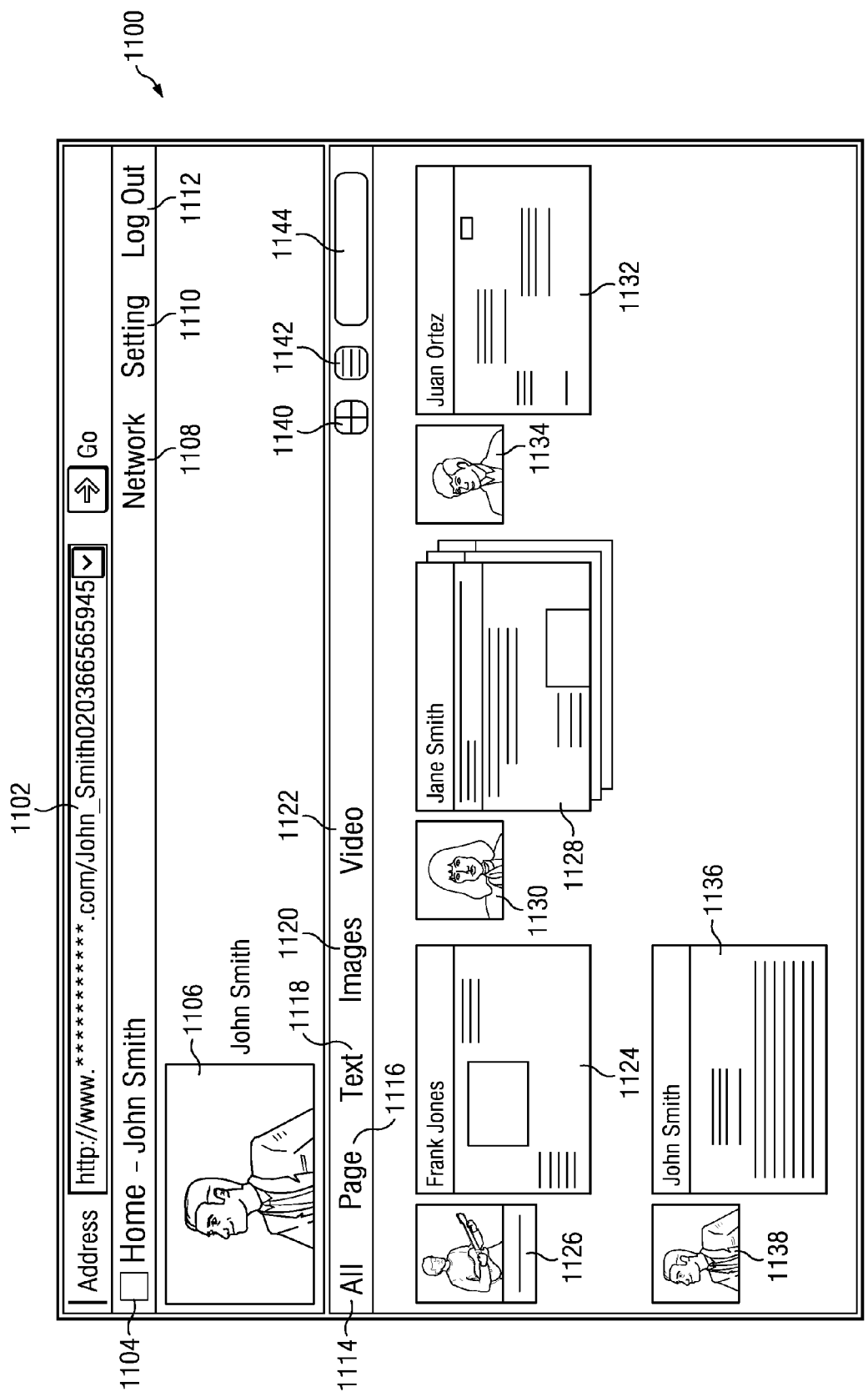
FIG. 11 illustrates an example graphical user interface showing a personal homepage.

FIG. 11 depicts an example personal home page 1100 of a registered user of networking system 20 in accordance with an embodiment. The home page may be accessed through the user's web browser in a similar fashion to other websites. In the illustration, the URL for the home page is shown in the address bar 1102 of the web browser viewing window 1100. In the illustrated embodiment, the primary user toolbar 1104 is positioned at the top of the viewing window 1100 and displays the user's name as well as several menu options including but by no means limited to Network 1108, Settings 1110, and Log Out 1112. The Network button 1108 may contain options enabling the user to update his contact list, create lists or groups of contacts, or delete contacts. The network button 1108 may also include options that allow a user to create a list of his favorites and manage slide objects from these individual users. The Settings button 1110 may enable the user to manage his own account with networking system 20. By way of example, Settings button 1110 may include menus with options that enable the user to change his contact information and his billing information. The Log Out button 1112 enables the user to log out of the webpage with a single click. The list of buttons shown in the main pane of FIG. 11 is meant to be representative and in no way should it be considered limiting or exhaustive. Other options can also be added to the menus. Also, other buttons can be added to this toolbar as well. For instance, in one embodiment, a privacy button could be available that allows a user to control how much personal information is made available to other users or third party vendors. Alternatively, privacy settings could be located under another button such as Network 1108 or Setting 1110. The home page may also contain an avatar 1106 for the user. The avatar can be a picture, a drawing, or some other representation chosen by the user. If the user does not choose an avatar, the avatar may be left blank or set to a default picture.

In various example embodiments, the toolbar may contain various menu options including All 1114, Page 1116, Text 1118, Images 1120, Video 1122, the 'grid' button 1140, the 'list' button 1142, and a search window 1144. The All button 1114 may provide the user with a list of options. Some of these options allow the user to handle interactions with contacts listed in the user's directory or displayed on the user's home page. The Page button 1116 may contain options that control the display of the user's home page. The Text 1118, Images 1120, and Video 1122 buttons in concert enable the user to manage slide objects and as well as other media on the user's home page generated by the user or by others. These buttons may include options that enable the user to save text, images, or video locally or to upload text, images, or video to server 22 and or data store 24 for accessing and viewing via the user's home page. In an example embodiment, these buttons may contain search options that enable a user to search for a particular type of media. Additionally, the grid button 1140 may enable the user to organize his contacts profiles as a grid. The list button 1142 may enable the user to arrange his contacts profiles as a list. The text window 1144 may enable searching from or within the homepage including, by way of example, searching for contacts or other users as well as for slide objects generated by the user or other users. By way of example, the user may use text window 1144 to search for slide objects by website location, date (e.g., the date the slide object was created or updated), author (slide object creator) name, text or any other attribute or data field of the slide object. Furthermore, users can be searched by name, attributes stored in their respective user profiles, webpages augmented slide objects generated by the users, or some other suitable criteria.

In the embodiment illustrated in FIG. 11, the profiles 1124, 1128, 1132, and 1136 of respective ones of the user's contacts are displayed in the lower pane of the browser viewing window 1100. Each contact profile display has a name (e.g., the contact's actual name or display name) attached to the profile as well as an associated avatar 1126, 1130, 1134, and 1138. In particular embodiments, slide content of slide objects created of each of the users are prominently displayed in their respective profiles 1124, 1128, 1132, and 1136. The user may also leave slide objects for viewing and or commenting by other users through the user's homepage. By way of example, the user may click on a particular user profile (or user profiles) and add a comment to a slide object through a text box interface.

Figure 12:
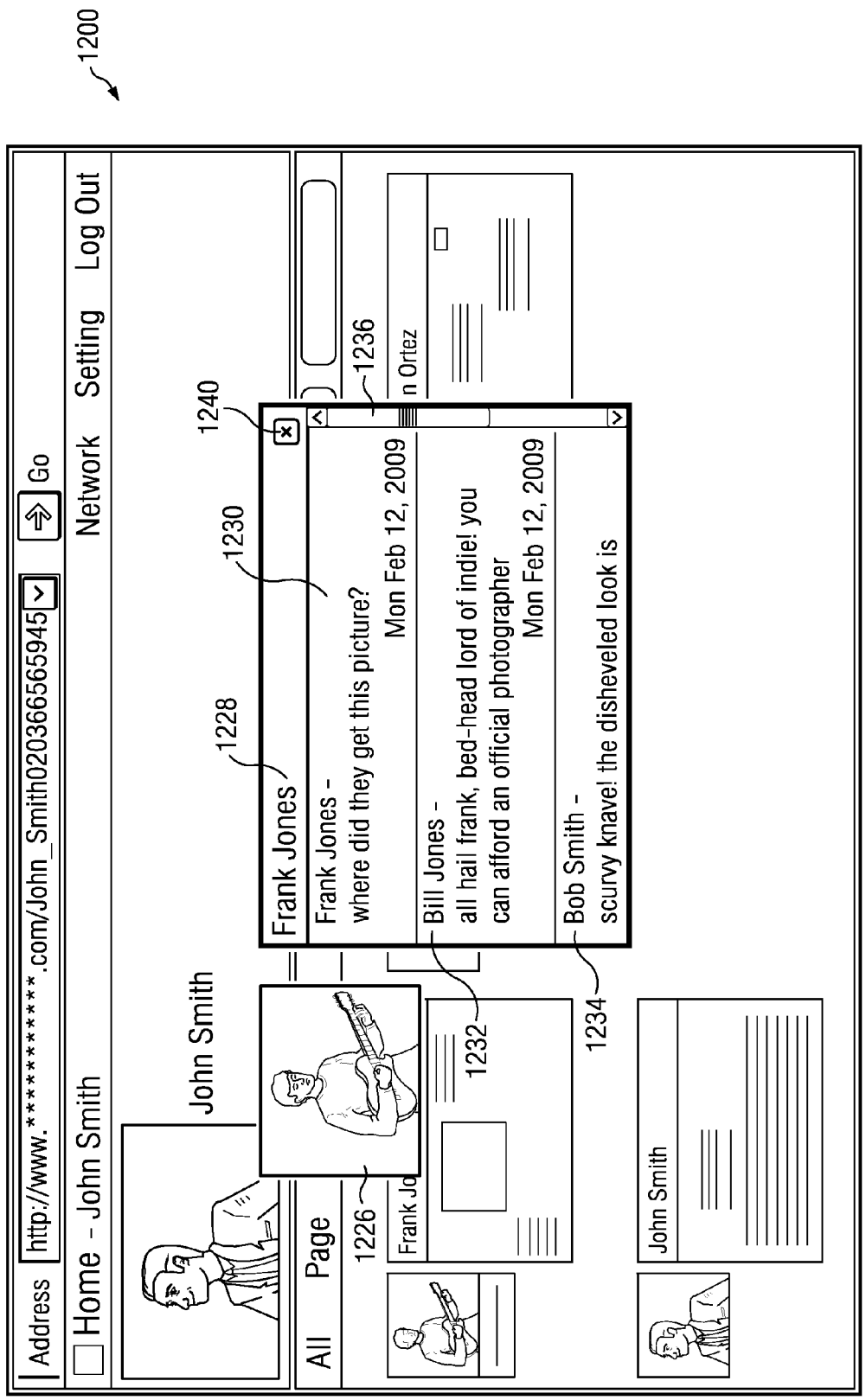
FIG. 12 illustrates an example graphical user interface showing a slide objects listing of a personal homepage.

FIG. 12 illustrates an example screenshot 1200 of a set of comments embedded in a slide object associated with another user's profile. In the example illustration, the user is viewing a set of comments 1230, 1232, 1234 embedded in a slide object of Frank Jones' profile. Frank's avatar 1226 is also prominently displayed. When a set of slide objects or a conversation is selected, the comments and/or other content may be displayed in a text reader 1228. The text reader features an exit button 1240, which, when pressed, causes the window to no longer be displayed. Also, the text reader 1228 may feature a slide bar that enables the user to scroll up and down bringing additional comments into the viewing window. These features are meant to be representative and are in no way limiting or exhaustive. In other embodiments, the text reader may include options allowing the window to be resized or moved. Furthermore, the text reader may include a text input feature which allows the user to add to a conversation from his or her home page. Additional information may also be presented along with the comment, such as, for example, hyperlinks to the pertinent website.

Although the present disclosure describes and illustrates particular steps of the methods or processes of FIGS. 3, 7, and 10 as occurring in a particular order, the present disclosure contemplates any suitable steps of the methods of FIGS. 3, 7, and 10 occurring in any suitable order. Moreover, although the present disclosure describes and illustrates particular components carrying out particular steps of the methods of FIGS. 3, 7, and 10, the present disclosure contemplates any suitable combination of any suitable components carrying out any suitable steps of the methods of FIGS. 3, 7, and 10.

The applications and/or processes described herein can be implemented as a series of computer-readable instructions, embodied or encoded on or within a tangible data storage medium, that when executed are operable to cause one or more processors to implement the operations described above. While the foregoing processes and mechanisms can be implemented by a wide variety of physical systems and in a wide variety of network and computing environments, the computing systems described below provide example computing system architectures of the server and client systems described above, for didactic, rather than limiting, purposes.

Figure 13:
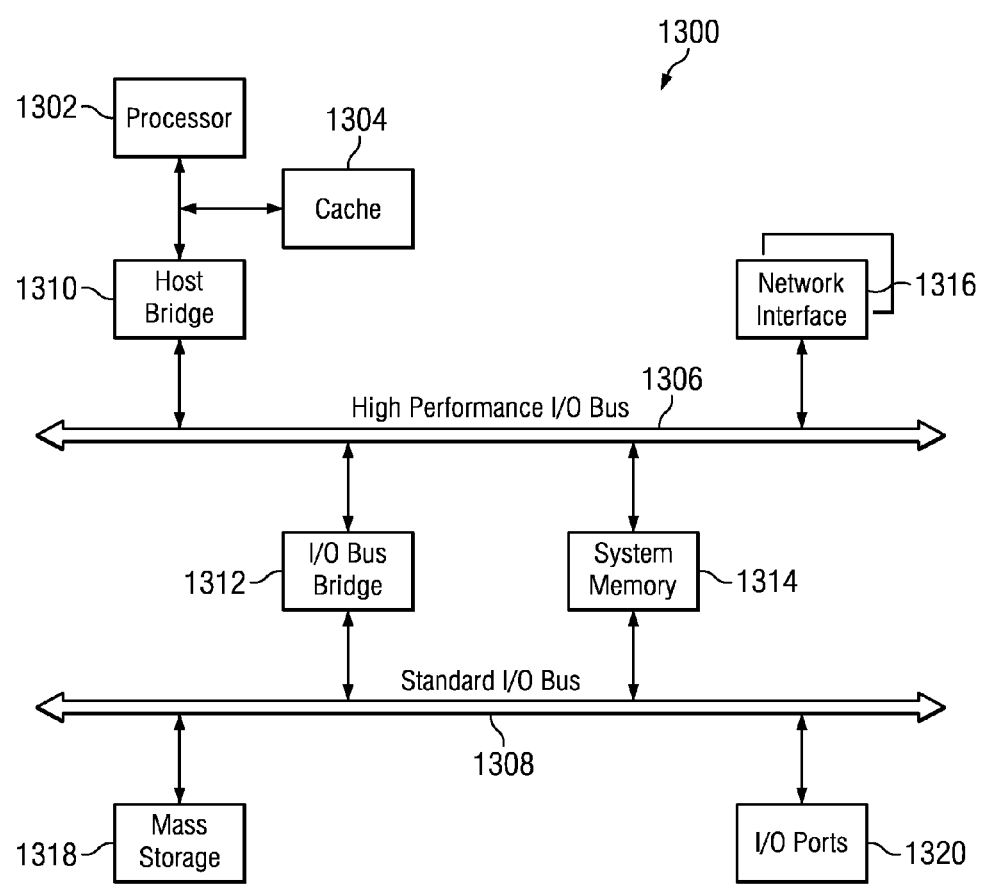
FIG. 13 illustrates an example computer system architecture.

FIG. 13 illustrates an example computing system architecture, which may be used to implement a server 22 or a client device 30. In one embodiment, hardware system 1300 comprises a processor 1302, a cache memory 1304, and one or more executable modules and drivers, stored on a tangible computer readable medium, directed to the functions described herein. Additionally, hardware system 1300 includes a high performance input/output (I/O) bus 1306 and a standard I/O bus 1308. A host bridge 1310 couples processor 1302 to high performance I/O bus 1306, whereas I/O bus bridge 1312 couples the two buses 1306 and 1308 to each other. A system memory 1314 and one or more network/communication interfaces 1316 couple to bus 1306. Hardware system 1300 may further include video memory (not shown) and a display device coupled to the video memory. Mass storage 1318 and I/O ports 1320 couple to bus 1308. Hardware system 1300 may optionally include a keyboard and pointing device, and a display device (not shown) coupled to bus 1308. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 1300 are described in greater detail below. In particular, network interface 1316 provides communication between hardware system 1300 and any of a wide range of networks, such as an Ethernet (e.g., IEEE 802.3) network, a backplane, etc. Mass storage 1318 provides permanent storage for the data and programming instructions to perform the above-described functions implemented in the servers 22a, 22b, whereas system memory 1314 (e.g., DRAM) provides temporary storage for the data and programming instructions when executed by processor 1302. I/O ports 1320 are one or more serial and/or parallel communication ports that provide communication between additional peripheral devices, which may be coupled to hardware system 1300.

Hardware system 1300 may include a variety of system architectures; and various components of hardware system 1300 may be rearranged. For example, cache 1304 may be on-chip with processor 1302. Alternatively, cache 1304 and processor 1302 may be packed together as a "processor module," with processor 1302 being referred to as the "processor core." Furthermore, certain embodiments of the present invention may not require nor include all of the above components. For example, the peripheral devices shown coupled to standard I/O bus 1308 may couple to high performance I/O bus 1306. In addition, in some embodiments, only a single bus may exist, with the components of hardware system 1300 being coupled to the single bus. Furthermore, hardware system 1300 may include additional components, such as additional processors, storage devices, or memories.

In one implementation, the operations of the embodiments described herein are implemented as a series of executable modules run by hardware system 1300, individually or collectively in a distributed computing environment. In a particular embodiment, a set of software modules and/or drivers implements a network communications protocol stack, browsing and other computing functions, optimization processes, and the like. The foregoing functional modules may be realized by hardware, executable modules stored on a computer readable medium, or a combination of both. For example, the functional modules may comprise a plurality or series of instructions to be executed by a processor in a hardware system, such as processor 1302. Initially, the series of instructions may be stored on a storage device, such as mass storage 1318. However, the series of instructions can be tangibly stored on any suitable storage medium, such as a diskette, CD-ROM, ROM, EEPROM, etc. Furthermore, the series of instructions need not be stored locally, and could be received from a remote storage device, such as a server on a network, via network/communications interface 1316. The instructions are copied from the storage device, such as mass storage 1318, into memory 1314 and then accessed and executed by processor 1302.

An operating system manages and controls the operation of hardware system 1300, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other implementations are possible. For example, the nickname generating functions described herein may be implemented in firmware or on an application specific integrated circuit.

Furthermore, the above-described elements and operations can be comprised of instructions that are stored on storage media. The instructions can be retrieved and executed by a processing system. Some examples of instructions are software, program code, and firmware. Some examples of storage media are memory devices, tape, disks, integrated circuits, and servers. The instructions are operational when executed by the processing system to direct the processing system to operate in accord with the invention. The term "processing system" refers to a single processing device or a group of inter-operational processing devices. Some examples of processing devices are integrated circuits and logic circuitry. Those skilled in the art are familiar with instructions, computers, and storage media.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising: in connection with a target structured document rendered by a first client application executing within a first client computing device, and in response to a user input initiated by a user at the first client computing device directed to target content, the target content comprising some or all of the content of the target structured document: accessing, by a second client application at the first client computing device, a representation of the target structured document generated by the first client application, the representation comprising a plurality of nodes each logically arranged in one of a plurality of levels that together logically form a hierarchical tree; determining, by the second client application, a target node from the plurality of nodes, the target node being logically arranged in a target level of the plurality of levels, the target node being associated with the target content; recursively scanning, by the second client application, one or more properties of each of one or more of the nodes logically arranged proximal to the target node within the hierarchical tree; generating, by the second client application, a set of one or more anchor point definitions based on one or more selected properties of each of the target node and one or more selected ones of the scanned nodes; and storing or causing to be stored, by the second client application, the set of anchor point definitions in a data structure.

2. The method of claim 1, wherein, upon accessing the target content, in connection with a subsequent accessing and rendering of the target structured document or a similar structured document that comprises the target content, by the first client application at the first client computing device or a third client application at a second client computing device, the second client application at the first client computing device or a fourth client application at the second client computing device, respectively, is configured to access the set of anchor point definitions and, based on the set of anchor point definitions, determine a candidate node from a representation of the structured document being subsequently accessed and rendered that most closely matches the target node.

3. The method of claim 1, wherein: the user input comprises a highlighting of the target content within the target structured document; and determining a target node from the plurality of nodes comprises: determining a lowest level node that comprises the highlighted target content; and selecting the lowest level node as the target node.

4. The method of claim 1, wherein: the user input comprises a positioning of a cursor or input pointer over the target content; and determining a target node from the plurality of nodes comprises: determining a lowest level node under the cursor or input pointer that comprises the target content; and selecting the lowest level node as the target node.

5. The method of claim 1, wherein: the user input comprises a user input that indicates a desire by the user to cause a content object to be rendered as an overlay to the target structured document; and determining a target node from the plurality of nodes comprises: determining a most relevant node corresponding to the content object; and selecting the most relevant node as the target node.

6. The method of claim 5, wherein determining the most relevant node comprises determining the nearest node relative to a current position of a cursor or input pointer or determining the node that comprises all or a portion of the target content most relevant to the content object.

7. The method of claim 1, wherein the anchor point definitions comprise: the selected properties of each of the target node and the selected scanned nodes; and structural information that defines structural relationships between the target node and the selected scanned nodes.

8. The method of claim 1, wherein: recursively scanning one or more properties of each of one or more of the nodes logically arranged proximal to the target node within the hierarchical tree comprises: traversing one or more logical branches of the hierarchical tree originating from the target node and recursively scanning one or more properties of each of one or more of the nodes logically arranged along each of the logical branches sequentially from the target node level down the logical branch through one or more levels logically below the target level; and generating a set of one or more anchor point definitions based on one or more selected properties of each of the target node and one or more selected ones of the scanned nodes comprises, for each of one or more of the logical branches: identifying one or more properties of each of one or more nodes along the logical branch until one or more nodes along the logical branch are each scanned and determined to comprise at least a predetermined number of suitable selected properties based on one or more corresponding properties of the target node, wherein the nodes logically below the nodes determined to comprise at least the predetermined number of suitable selected properties are not scanned, and wherein the set of anchor point definitions are based on the suitable selected properties and structural information corresponding to selected ones of the scanned nodes along the logical branch.

9. The method of claim 8, wherein the predetermined number of suitable selected properties for a particular node is dependent at least in part on the node type of the particular node or the position of the particular node relative to the target node in the hierarchical tree.

10. The method of claim 8, wherein: recursively scanning one or more properties of each of one or more of the nodes logically arranged proximal to the target node within the hierarchical tree comprises: scanning one or more properties of one or more selected nodes that each comprise the target node; and generating a set of one or more anchor point definitions based on one or more selected properties of each of the target node and one or more selected ones of the scanned nodes comprises: identifying one or more selected properties of each of the one or more selected nodes that each comprise the target node, wherein the set of anchor point definitions are further based on the selected properties and structural information corresponding to the selected scanned nodes that each comprise the target node.

11. The method of claim 10, wherein: recursively scanning one or more properties of each of one or more of the nodes logically arranged proximal to the target node within the hierarchical tree comprises: scanning one or more properties of one or more selected nodes that are each logically arranged within the target level along one or more logical branches originating from one or more nodes that each comprise the target node; and generating a set of one or more anchor point definitions based on one or more selected properties of each of the target node and one or more selected ones of the scanned nodes comprises: identifying one or more selected properties of each of the one or more selected nodes that are each logically arranged within the target level along the one or more logical branches originating from the one or more nodes that each comprise the target node, wherein the set of anchor point definitions are further based on the selected properties and structural information corresponding to the selected scanned nodes that are each logically arranged within the target level along the one or more logical branches originating from the one or more nodes that each comprise the target node.

12. The method of claim 1, wherein the one or more selected properties scanned for each of the target node or the selected scanned nodes comprise one or more of a node type, a node name, a node value, or an image or other data source identifier or address.

13. The method of claim 1, further comprising: receiving user input from the user to generate a content object that comprises content that is personalized by the user, generated by the user, or not native to the target structured document; and storing the content object in the data structure or a second data structure; wherein, upon accessing the target content in connection with a subsequent rendering of the target structured document or a similar structured document that comprises the target content by the first client application at the first client computing device or a third client application at a second client computing device, the second client application at the first client computing device or a fourth client application at the second client computing device, respectively, is configured to access the set of anchor point definitions and, based on the set of anchor point definitions, render or cause to be rendered the content of the content object as an overlay to the structured document being subsequently accessed and rendered at a predetermined position relative to the candidate node.

14. The method of claim 13, further comprising receiving a selection of one or more recipient users for the content object, wherein the second or fourth client application is configured to render or cause to be rendered the content object only when used by the user or one of the selected recipient users.

15. The method of claim 14, wherein to render or cause to be rendered the content object, the second or fourth client application is configured to modify the representation of the corresponding accessed structured document to include the content such that, when the accessed structured document is rendered by the first or third client application, respectively, the content of the content object is rendered as an overlay to the structured document being subsequently accessed and rendered at a predetermined position relative to the candidate node.

16. The method of claim 1, wherein the data structure is stored within one or more servers or databases located remotely relative to the first client computing device.

17. The method of claim 1, wherein the target structured document comprises a portion of a web page or web application.

18. The method of claim 1, wherein the content of the content object comprises one or more of text, an image, a video, or an audio clip.

19. The method of claim 1, wherein: the first client application or third client application comprises a web browser; and the second client application or fourth client application comprises a plug-in software component that executes in the context of the first or third client application, respectively.

20. A method comprising: in connection with rendering a target structured document by a first client application executing within a first client computing device, determining, by a second client application at the first client computing device, if the target structured document is associated with a content object distinct from content of the target structured document, and, if the target structured document is associated with a content object: accessing, by the second client application, a representation of the target structured document at the first client computing device, the representation comprising a plurality of nodes each logically arranged in one of a plurality of levels that together logically form a hierarchical tree; accessing, by the second client application, a data store located remotely from the first client computing device, the data store storing one or more content objects, each content object comprising corresponding content distinct from content of the target structured document and a set of one or more anchor point definitions; identifying, by the second client application, one or more of the content objects that are each associated with the target structured document based on their corresponding sets of anchor point definitions; and for each of the one or more content objects identified as being associated with the target structured document: accessing, by the second client application, the content and anchor point definitions corresponding to the content object; analyzing, by the second client application, the corresponding set of anchor point definitions; determining, by the second client application, a target node from the plurality of nodes based on the corresponding set of anchor point definitions; and using the determined target nodes to locate where the content corresponding to the content object is to be rendered as an overlay to the target structured document at a predetermined position relative to target content defined by the target node based on the corresponding set of anchor point definitions.

21. The method of claim 20 further comprising modifying, by the second client application, the representation such that the first client application renders the content corresponding to the content object as an overlay to the target structured document at the predetermined position relative to target content defined by the target node based on the corresponding set of anchor point definitions.

22. The method of claim 20, wherein: each content object stored in the data store is associated with a corresponding resource identifier included in the corresponding set of anchor point definitions; and determining if the target structured document is associated with a content object comprises: accessing the data store; comparing a target resource identifier corresponding to the target structured document with the resource identifiers corresponding to the content objects stored in the data store; and if the target resource identifier, or a suitable sub-string or pattern thereof, matches a resource identifier corresponding to a content object, or a suitable sub-string or pattern thereof, determining that the target structured document is associated with the content object and, thereby, identifying the content object as being associated with the target structured document.

23. The method of claim 20, wherein: each set of anchor point definitions comprises one or more properties for each of a plurality of test nodes, the plurality of test nodes comprising a test target node and one or more test environment nodes, the set of anchor point definitions further defining logical structural relationships between each of the test nodes, wherein the plurality of test nodes, the corresponding properties of the plurality of test nodes, and the logical structural relationships between each of the plurality of test nodes together define a test environment around and including the test target node; and analyzing the corresponding set of anchor point definitions comprises analyzing the one or more properties corresponding to each of the plurality of test nodes and the structural relationships between each of the test nodes.

24. The method of claim 23, wherein determining a target node for a content object comprises determining the node of the plurality of nodes that most closely matches the test target node and selecting that node as the target node.

25. The method of claim 24, wherein determining the node of the plurality of nodes that most closely matches the test target node comprises: for each node of the plurality of nodes: setting the node as a candidate target node; comparing the test environment with a candidate environment of nodes around and including the candidate target node based on the properties and logical structural relationships of the test nodes in the test environment and properties and logical structural relationships corresponding to the nodes in the candidate environment; and generating a matching score for the candidate node based on the comparison.

26. The method of claim 25, further comprising, for each node of the plurality of nodes: comparing the matching score to a predetermined threshold value; and if the matching score is greater than the predetermined threshold value, selecting the candidate target node as the target node.

27. The method of claim 25, further comprising: for each node of the plurality of nodes: comparing the matching score to a predetermined threshold value; and if the matching score is greater than the predetermined threshold value, identifying the candidate target node as a probable target node; and selecting the probable node having the highest matching score as the target node.

28. The method of claim 25, wherein: the properties and logical structural relationships corresponding to the nodes in the test environment are serialized into a first data string; the properties and logical structural relationships corresponding to the nodes in the candidate environment are serialized into a second data string; comparing the test environment with the candidate environment comprises computing a distance between the first data string and the second data string; and the matching score is based at least in part on the computed distance.

29. The method of claim 23, wherein the one or more properties comprise one or more of a node type, a node name, a node value, or an image or other data source identifier or address.

30. The method of claim 20, wherein the target structured document comprises a portion of a web page or web application.

31. The method of claim 20, wherein the content of the content object comprises one or more of text, an image, a video, or an audio clip.

32. The method of claim 20, wherein: the first client application comprises a web browser; and the second client application comprises a plug-in software component that executes in the context of the first client application.

* * * * *